(12) United States Patent
Garcia Rodriguez et al.

(10) Patent No.: US 11,658,705 B2
(45) Date of Patent: May 23, 2023

(54) SHARING TRANSMISSION OPPORTUNITY WITH BEAMFORMING

(71) Applicant: Nokia Technologies Oy, Espoo (FI)

(72) Inventors: Adrian Garcia Rodriguez, Dublin (IE); David Lopez-Perez, Dublin (IE); Lorenzo Galati Giordano, Dublin (IE); Olli Alanen, Vantaa (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 17/594,959

(22) PCT Filed: May 9, 2019

(86) PCT No.: PCT/FI2019/050359
§ 371 (c)(1),
(2) Date: Nov. 4, 2021

(87) PCT Pub. No.: WO2020/225474
PCT Pub. Date: Nov. 12, 2020

(65) Prior Publication Data
US 2022/0302963 A1 Sep. 22, 2022

(51) Int. Cl.
*H04B 7/06* (2006.01)
*H04B 7/024* (2017.01)
*H04L 25/02* (2006.01)

(52) U.S. Cl.
CPC .......... *H04B 7/024* (2013.01); *H04B 7/0617* (2013.01); *H04B 7/0626* (2013.01); *H04L 25/0224* (2013.01)

(58) Field of Classification Search
CPC .... H04B 7/0617; H04B 7/024; H04B 7/0626; H04L 25/0224
See application file for complete search history.

(56) References Cited

U.S. PATENT DOCUMENTS

| 2012/0147804 A1 | 6/2012 | Hedayat et al. ............. 370/312 |
| 2018/0331749 A1 | 11/2018 | Ghosh |
| 2019/0028168 A1* | 1/2019 | Vermani ............. H04B 7/0626 |
| 2020/0328857 A1* | 10/2020 | Ouchi .................... H04B 7/024 |

(Continued)

OTHER PUBLICATIONS

Garcia-Rodriguez, Adrian, et al., "Coordinated Null Steering for EHT", Nokia, Mar. 6, 2019, IEEE 802.11-19/0811r0, 16 pgs.

*Primary Examiner* — Jaison Joseph
(74) *Attorney, Agent, or Firm* — Harrington & Smith

(57) ABSTRACT

This document discloses a solution for sharing a transmission opportunity in a wireless network. According to an aspect, a method for an apparatus of a first wireless network includes determining a plurality of devices of a second wireless network for null steering; transmitting a trigger frame, the trigger frame indicating a transmission period for data frame transfer between the apparatus and another apparatus of the first wireless network, a spatial reuse opportunity for the second wireless network during the transmission period, and an additional period preceding the transmission period; receiving, from at least one device of the second wireless network during the additional period, a channel state frame; and performing, based on the channel state frame, null steering towards the at least one device during the transmission period.

20 Claims, 11 Drawing Sheets

(56) References Cited

U.S. PATENT DOCUMENTS

2022/0294493 A1* 9/2022 Garcia Rodriguez ........................ H04W 16/28
2022/0368391 A1* 11/2022 Garcia Rodriguez ........................ H04B 7/0608

* cited by examiner

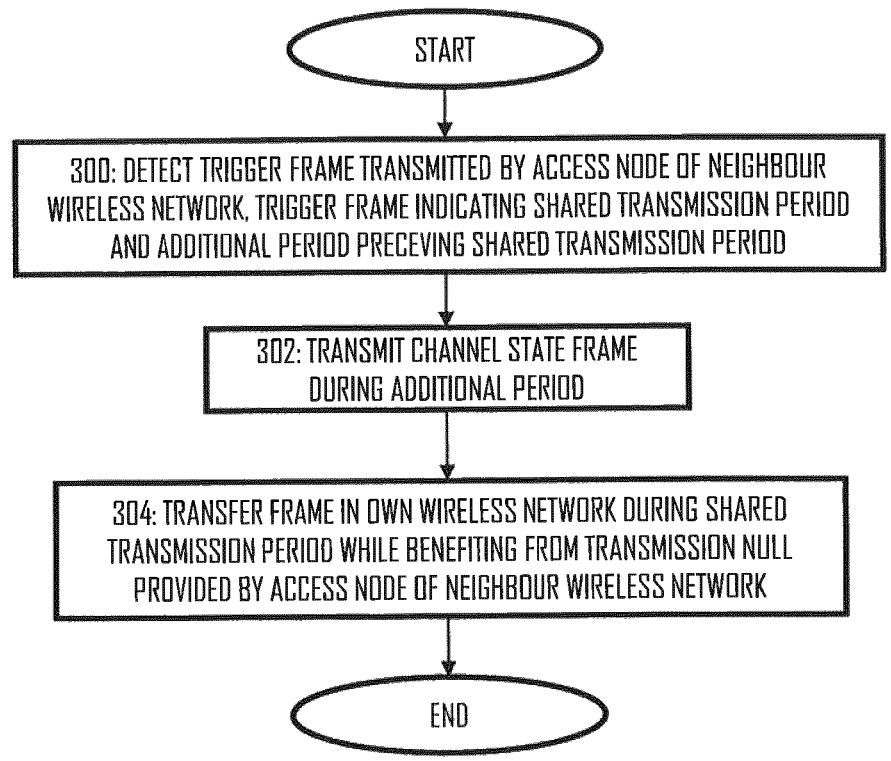
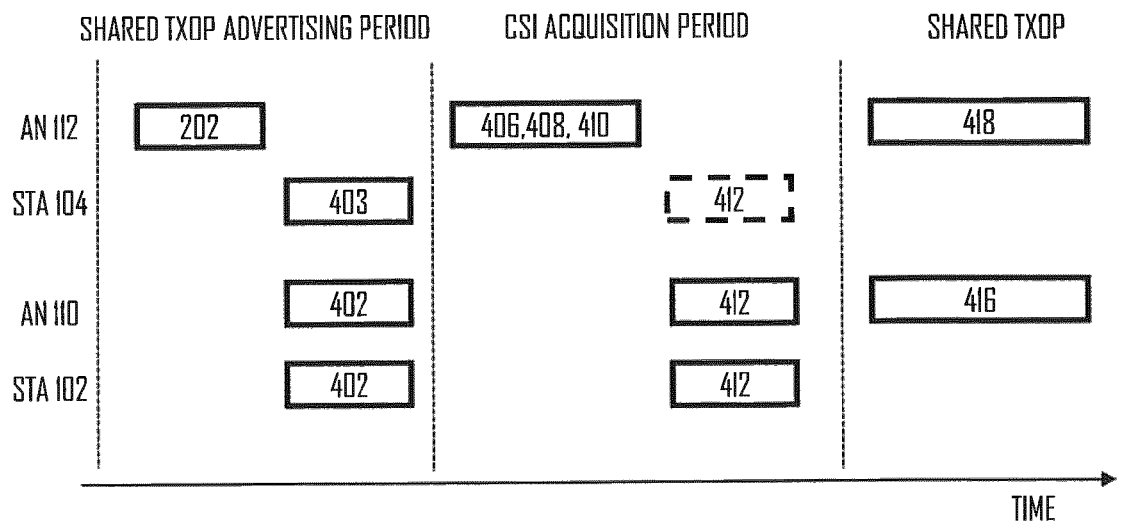

SHARING TRANSMISSION OPPORTUNITY WITH BEAMFORMING

CROSS REFERENCE TO RELATED APPLICATION

This patent application is a U.S. National Stage application of International Patent Application Number PCT/FI2019/050359 filed May 9, 2019 hereby incorporated by reference in its entirety.

FIELD

Various embodiments described herein relate to the field of wireless communications and, particularly, to sharing a transmission opportunity between wireless devices supporting beamforming.

BACKGROUND

Constant demand of higher throughput and capacity and density of various wireless networks sets a demand for improving spectral efficiency. Beamforming is a technique where a transmitter focuses radio energy towards an intended recipient and/or reduces radio energy towards an unintended recipient. The benefit may be improved link quality and/or reduced interference towards other radio receivers, as well as an improved spatial reuse.

BRIEF DESCRIPTION

Some aspects of the invention are defined by the independent claims.

Some embodiments of the invention are defined in the dependent claims.

According to an aspect, there is provided an apparatus for a first wireless network, comprising means for performing: determining a plurality of devices of a second wireless network for null steering; transmitting a trigger frame, the trigger frame indicating a transmission period for data frame transfer between the apparatus and another apparatus of the first wireless network, a spatial reuse opportunity for the second wireless network during the transmission period, and an additional period preceding the transmission period; receiving, from at least one device of the second wireless network during the additional period, a channel state frame; and performing, based on the channel state frame, null steering towards the at least one device during the transmission period.

In an embodiment, the additional period is dedicated to the acquisition of the channel state frame from at least one device of the second wireless network, and wherein the trigger frame indicates a duration of the additional period.

In an embodiment, the plurality of devices of the second wireless network are determined based on inter-network measurements.

In an embodiment, the trigger frame is a multi-user request-to-send frame, and wherein the channel state frame comprises a beamforming report comprising channel state information measured by the at least one device of the second wireless network.

In an embodiment, the means are configured to transmit, during the additional period, an announcement frame indicating the at least one device of the second wireless network and a channel sounding signal for measurement of the channel state information.

In an embodiment, the announcement frame is addressed to the at least one device of the second wireless network to prepare the at least one device of the second wireless network for measuring the channel sounding signal.

In an embodiment, the trigger frame indicates uplink transmission for the transmission period, and wherein the channel state frame comprises an uplink pilot signal.

In an embodiment, the trigger frame is addressed to the at least one station of the second wireless network.

In an embodiment, the means are further configured to perform: determining a first set of devices of the second wireless network as potential target devices for null steering; transmitting a null steering request to one or more devices of the first set; receiving at least one null steering response as a response to the null steering request, wherein the at least one null steering response indicates a subset of the first set of devices, the subset having a need for null steering and including the at least one device of the second wireless network; and performing, during the transmission period, the null steering towards the subset of the first set of devices.

According to another aspect, there is provided an apparatus for a first wireless network, comprising means for performing: detecting a trigger frame transmitted by an access node of a second wireless network, the trigger frame indicating a transmission period for data frame transfer between the access node and a station of the second wireless network, a spatial reuse opportunity for the first wireless network during the transmission period, and an additional period preceding the transmission period; transmitting, during the additional period, a channel state frame to the access node; and transferring a frame with another apparatus of the first wireless network during the transmission period.

In an embodiment, the means are configured to enter a power-save mode when detecting a frame transmitted by the access node of the second wireless network, the frame indicating channel occupation by the second wireless network for a determined duration, to prevent, in response to the detection of the trigger frame transmitted by the access node of the second wireless network, the apparatus from entering the power-save mode and, instead of the power-save mode, transmit the channel state frame during the additional period.

In an embodiment, the trigger frame is a multi-user request-to-send frame addressed to the apparatus, wherein the channel state frame comprises a beamforming report comprising channel state information measured by the apparatus, and wherein the means are configured, upon detecting the multi-user request-to-send frame addressed to the apparatus, to prevent entering a power-save mode during the additional period.

In an embodiment, the additional period is dedicated to the acquisition of the channel state information, and wherein the means are configured to delay a start of the transmission period for a duration of the additional period.

In an embodiment, the trigger frame indicates uplink transmission for the transmission period, and wherein the channel state frame comprises an uplink pilot signal transmitted by the apparatus.

In an embodiment, the means are further configured to perform: receiving a null steering request from the access node of the second wireless network; determining at least one device of the first wireless network that has a need for null steering by the access node of the second wireless network; and transmitting a null steering response as a response to the null steering request, wherein the null steering response indicates the at least one device of the first wireless network.

In an embodiment, the means described above comprises: at least one processor; and at least one memory including computer program code, the at least one memory and computer program code configured to, with the at least one processor, cause the performance of the apparatus.

According to an aspect, there is provided a method for an apparatus of a first wireless network, comprising: determining, by the apparatus, a plurality of devices of a second wireless network for null steering; transmitting a trigger frame by the apparatus, the trigger frame indicating a transmission period for data frame transfer between the apparatus and another apparatus of the first wireless network, a spatial reuse opportunity for the second wireless network during the transmission period, and an additional period preceding the transmission period; receiving, by the apparatus from at least one device of the second wireless network during the additional period, a channel state frame; and performing, by the apparatus based on the channel state frame, null steering towards the at least one device during the transmission period.

In an embodiment, the additional period is dedicated to the acquisition of the channel state frame from at least one device of the second wireless network, and wherein the trigger frame indicates a duration of the additional period.

In an embodiment, the plurality of devices of the second wireless network are determined based on inter-network measurements.

In an embodiment, the trigger frame is a multi-user request-to-send frame, and wherein the channel state frame comprises a beamforming report comprising channel state information measured by the at least one device of the second wireless network.

In an embodiment, the apparatus transmits, during the additional period, an announcement frame indicating the at least one device of the second wireless network and a channel sounding signal for measurement of the channel state information.

In an embodiment, the announcement frame is addressed to the at least one device of the second wireless network to prepare the at least one device of the second wireless network for measuring the channel sounding signal.

In an embodiment, the trigger frame indicates uplink transmission for the transmission period, and wherein the channel state frame comprises an uplink pilot signal.

In an embodiment, the trigger frame is addressed to the at least one station of the second wireless network.

In an embodiment, the method further comprises: determining, by the apparatus, a first set of devices of the second wireless network as potential target devices for null steering; transmitting, by the apparatus, a null steering request to one or more devices of the first set; receiving, by the apparatus, at least one null steering response as a response to the null steering request, wherein the at least one null steering response indicates a subset of the first set of devices, the subset having a need for null steering and including the at least one device of the second wireless network; and performing, by the apparatus during the transmission period, the null steering towards the subset of the first set of devices.

According to another aspect, there is provided a method for an apparatus of a first wireless network, comprising: detecting, by the apparatus, a trigger frame transmitted by an access node of a second wireless network, the trigger frame indicating a transmission period for data frame transfer between the access node and a station of the second wireless network, a spatial reuse opportunity for the first wireless network during the transmission period, and an additional period preceding the transmission period; transmitting, by the apparatus during the additional period, a channel state frame to the access node; and transferring, by the apparatus, a frame with another apparatus of the first wireless network during the transmission period.

In an embodiment, the apparatus enters a power-save mode when detecting a frame transmitted by the access node of the second wireless network, the frame indicating channel occupation by the second wireless network for a determined duration, but prevents, in response to the detection of the trigger frame transmitted by the access node of the second wireless network, entering the power-save mode and, instead of the power-save mode, transmits the channel state frame during the additional period.

In an embodiment, the trigger frame is a multi-user request-to-send frame addressed to the apparatus, wherein the channel state frame comprises a beamforming report comprising channel state information measured by the apparatus, and wherein the apparatus prevents, upon detecting the multi-user request-to-send frame addressed to the apparatus, entering a power-save mode during the additional period.

In an embodiment, the additional period is dedicated to the acquisition of the channel state information, and wherein the means are configured to delay a start of the transmission period for a duration of the additional period.

In an embodiment, the trigger frame indicates uplink transmission for the transmission period, and wherein the channel state frame comprises an uplink pilot signal transmitted by the apparatus.

In an embodiment, the method further comprises: receiving, by the apparatus, a null steering request from the access node of the second wireless network; determining, by the apparatus, at least one device of the first wireless network that has a need for null steering by the access node of the second wireless network; and transmitting, by the apparatus, a null steering response as a response to the null steering request, wherein the null steering response indicates the at least one device of the first wireless network.

According to another aspect, there is provided a computer program product embodied on a computer-readable medium and comprising a computer program code readable by a computer for an apparatus of a first wireless network, wherein the computer program code configures the computer to carry out a computer process comprising: detecting a trigger frame transmitted by an access node of a second wireless network, the trigger frame indicating a transmission period for data frame transfer between the access node and a station of the second wireless network, a spatial reuse opportunity for the first wireless network during the transmission period, and an additional period preceding the transmission period; transmitting, during the additional period, a channel state frame to the access node; and transferring a frame with another apparatus of the first wireless network during the transmission period.

According to another aspect, there is provided a computer program product embodied on a computer-readable medium and comprising a computer program code readable by a computer for an apparatus of a first wireless network, wherein the computer program code configures the computer to carry out a computer process comprising: determining a plurality of devices of a second wireless network for null steering; transmitting a trigger frame, the trigger frame indicating a transmission period for data frame transfer between the apparatus and another apparatus of the first wireless network, a spatial reuse opportunity for the second wireless network during the transmission period, and an additional period preceding the transmission period; receiving, from at least one device of the second wireless network during the additional period, a channel state frame; and performing, based on the channel state frame, null steering towards the at least one device during the transmission period.

According to another aspect, there is provided a method for an apparatus of a first wireless network, comprising: determining, by the apparatus, a first set of devices of a second wireless network as potential target devices for null steering; transmitting, by the apparatus, a trigger frame, the trigger frame indicating a transmission period for data frame transfer between the apparatus and another apparatus of the first wireless network, and further indicating a shared transmission opportunity for the second wireless network during the transmission period; transmitting, by the apparatus, a null steering request to one or more devices of the first set; receiving, by the apparatus, at least one null steering response as a response to the null steering request, wherein the at least one null steering response indicates a subset of the first set of devices, the subset having a need for null steering; and performing, by the apparatus during the transmission period, null steering towards the at least one of the plurality of the devices from which the at least one null steering response was received.

In an embodiment, the first set of devices of the second wireless network is determined based on inter-network measurements.

In an embodiment, the trigger frame is a multi-user request-to-send frame transmitted before the null steering request.

In an embodiment, the trigger frame indicates uplink transmission for the transmission period, and wherein the null steering request is comprised in the trigger frame.

In an embodiment, the null steering request indicates a dedicated resource to each of the one or more devices of the first set, and wherein the at least one null steering response is received in the dedicated resource or resources indicated by the null steering request.

In an embodiment, the null steering response indicates only the subset of the first set of devices that intend to communicate a frame during the transmission period.

In an embodiment, the trigger frame further indicates an additional period preceding the transmission period, and wherein the apparatus receives, from the subset of the first set of devices during the additional period, a channel state frame.

In an embodiment, the apparatus transmits, during the additional period, an announcement frame indicating a device of the subset of the first set of devices and a channel sounding signal for measurement of channel state information.

According to another aspect, there is provided a method for an apparatus of a first wireless network, comprising: detecting, by the apparatus, a trigger frame transmitted by an access node of a second wireless network, the trigger frame indicating a transmission period for data frame transfer between the access node and a station of the second wireless network, and further indicating a shared transmission opportunity for the first wireless network during the transmission period; receiving, by the apparatus, a null steering request addressed to the apparatus and transmitted by the access node; transmitting, by the apparatus, a null steering response as a response to the null steering request, wherein the null steering response indicates that the apparatus has a need for null steering by the access node; and transferring, by the apparatus, a frame with another apparatus of the first wireless network during the transmission period.

In an embodiment, the trigger frame is a multi-user request-to-send frame received before the null steering request.

In an embodiment, the trigger frame indicates a subsequent uplink transmission for the transmission period, and wherein the null steering request is comprised in the trigger frame.

In an embodiment, the null steering request indicates a dedicated resource to the apparatus, and wherein the apparatus transmits the null steering response in the dedicated resource indicated by the null steering request.

In an embodiment, the apparatus indicates by transmitting the null steering response that the apparatus intends to communicate the frame during the transmission period.

In an embodiment, the trigger frame further indicates an additional period preceding the transmission period, and wherein the apparatus transmits a channel state frame during the additional period.

In an embodiment, the apparatus further receives, from the access node during the additional period, an announcement frame indicating the apparatus and a channel sounding signal and, as a response to the announcement frame indicating the apparatus, measures the channel sounding signal, generates channel state information on the basis of the measurement, and transmits the channel state frame comprising the channel state information.

According to another aspect, there is provided an apparatus for a first wireless network, comprising means for performing: determining a first set of devices of a second wireless network as potential target devices for null steering; transmitting a trigger frame, the trigger frame indicating a transmission period for data frame transfer between the apparatus and another apparatus of the first wireless network, and further indicating a shared transmission opportunity for the second wireless network during the transmission period; transmitting a null steering request to one or more devices of the first set; receiving, by the apparatus, at least one null steering response as a response to the null steering request, wherein the at least one null steering response indicates a subset of the first set of devices, the subset having a need for null steering; and performing, by the apparatus during the transmission period, null steering towards the at least one of the plurality of the devices from which the at least one null steering response was received.

In an embodiment, the first set of devices of the second wireless network is determined based on inter-network measurements.

In an embodiment, the trigger frame is a multi-user request-to-send frame transmitted before the null steering request.

In an embodiment, the trigger frame indicates uplink transmission for the transmission period, and wherein the null steering request is comprised in the trigger frame.

In an embodiment, the null steering request indicates a dedicated resource to each of the one or more devices of the first set, and wherein the means are configure to receive at least one null steering response in the dedicated resource or resources indicated by the null steering request.

In an embodiment, the null steering response indicates only the subset of the first set of devices that intend to communicate a frame during the transmission period.

In an embodiment, the trigger frame further indicates an additional period preceding the transmission period, and wherein the means are further configured to receive, from the subset of the first set of devices during the additional period, a channel state frame.

In an embodiment, the means are configured to transmit, during the additional period, an announcement frame indicating a device of the subset of the first set of devices and a channel sounding signal for measurement of channel state information.

According to another aspect, there is provided an apparatus for a first wireless network, comprising means for performing: detecting a trigger frame transmitted by an access node of a second wireless network, the trigger frame indicating a transmission period for data frame transfer between the access node and a station of the second wireless network, and further indicating a shared transmission opportunity for the first wireless network during the transmission period; receiving a null steering request addressed to the apparatus and transmitted by the access node; transmitting a null steering response as a response to the null steering request, wherein the null steering response indicates that the apparatus has a need for null steering by the access node; and transferring a frame with another apparatus of the first wireless network during the transmission period.

In an embodiment, the trigger frame is a multi-user request-to-send frame received before the null steering request.

In an embodiment, the trigger frame indicates a subsequent uplink transmission for the transmission period, and wherein the null steering request is comprised in the trigger frame.

In an embodiment, the null steering request indicates a dedicated resource to the apparatus, and wherein the means are configured to transmit the null steering response in the dedicated resource indicated by the null steering request.

In an embodiment, the means are configured to indicate by transmitting the null steering response that the apparatus intends to communicate the frame during the transmission period.

In an embodiment, the trigger frame further indicates an additional period preceding the transmission period, and wherein the means are further configured to transmit a channel state frame during the additional period.

In an embodiment, the means are further configured to receive, from the access node during the additional period, an announcement frame indicating the apparatus and a channel sounding signal and, as a response to the announcement frame indicating the apparatus, to measure the channel sounding signal, generate channel state information on the basis of the measurement, and to transmit the channel state frame comprising the channel state information.

According to another aspect, there is provided a computer program product embodied on a computer-readable medium and comprising a computer program code readable by a computer for an apparatus of a first wireless network, wherein the computer program code configures the computer to carry out a computer process comprising: detecting a trigger frame transmitted by an access node of a second wireless network, the trigger frame indicating a transmission period for data frame transfer between the access node and a station of the second wireless network, and further indicating a shared transmission opportunity for the first wireless network during the transmission period; receiving a null steering request addressed to the apparatus and transmitted by the access node; transmitting a null steering response as a response to the null steering request, wherein the null steering response indicates that the apparatus has a need for null steering by the access node; and transferring a frame with another apparatus of the first wireless network during the transmission period.

According to another aspect, there is provided a computer program product embodied on a computer-readable medium and comprising a computer program code readable by a computer for an apparatus of a first wireless network, wherein the computer program code configures the computer to carry out a computer process comprising: determining a first set of devices of a second wireless network as potential target devices for null steering; transmitting a trigger frame, the trigger frame indicating a transmission period for data frame transfer between the apparatus and another apparatus of the first wireless network, and further indicating a shared transmission opportunity for the second wireless network during the transmission period; transmitting a null steering request to one or more devices of the first set; receiving, by the apparatus, at least one null steering response as a response to the null steering request, wherein the at least one null steering response indicates a subset of the first set of devices, the subset having a need for null steering; and performing, by the apparatus during the transmission period, null steering towards the at least one of the plurality of the devices from which the at least one null steering response was received.

LIST OF DRAWINGS

Embodiments are described below, by way of example only, with reference to the accompanying drawings, in which FIG. 1 illustrates a wireless communication scenario to which some embodiments of the invention may be applied;

FIGS. 2 and 3 illustrate some embodiments of processes for acquiring channel state information for null steering;

FIGS. 4A and 4B illustrate an embodiment for acquiring the channel state information for a shared transmission opportunity related to downlink;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
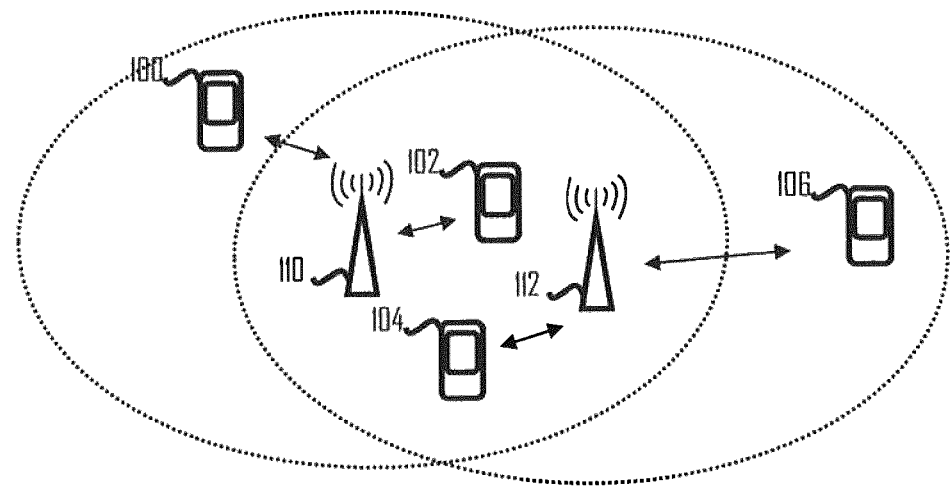

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100 to 106. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 102, 104 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11 specifications specify a data transmission mode that includes a primary channel and secondary channels. The primary channel is used in all data transmissions and, in addition to the primary channel, one or more secondary channels may be employed for additional bandwidth. The transmission band of a BSS may contain the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel.

Some IEEE 802.11 networks employ channel contention based on carrier sense multiple access with collision avoidance (CSMA/CA) for channel access. Every device attempting to gain a TXOP is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the STA gains the TXOP and starts frame transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

The STA 100 to 106 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

For the sake of the following description, let us assume a situation where the stations 100 and 102 are associated to the access node 110 while the stations 104 and 106 are associated to the access node 112. Further, the access nodes 110, 112 manage different wireless networks having different network identifiers, e.g. different SSIDs. FIG. 1 illustrates coverage areas of the respected networks. Stations 100 to 104 are located within the coverage area of the access node 110 while the stations 102 to 106 are located within the coverage area of the access node 112. Stations 104 and 102 are thus within a communication range of both access nodes 110, 112. It means that the access node 112 is a potential source of interference to the station 102 and the access node 110 is a potential source of interference to the station 104. Since the station 102 is not associated to the access node 112, overall performance of the wireless network of the access node 110 could be improved if the access node 112 reduced interference towards the station 102. The same applies to the station 104 and the wireless network of the access node 112: reduction of interference from the access node 110 towards the station 104 would improve the performance of a link between the access node 112 and the station 104.

The access nodes 110, 112 may comprise an antenna array that enables beamforming. As known in the art, beamforming or spatial filtering is a signal processing technique used for directional signal transmission or reception. The spatial filtering is achieved by combining signals in the antenna array in such a way that signals transmitted to particular angles experience constructive interference while signals transmitted to other angles experience destructive interference. Beamforming can be used at both the transmitting and receiving ends in order to achieve spatial selectivity. The improvement is directivity of radio signal to desired directions and reduction in the emitted radio energy to undesired directions.

Figure 2:
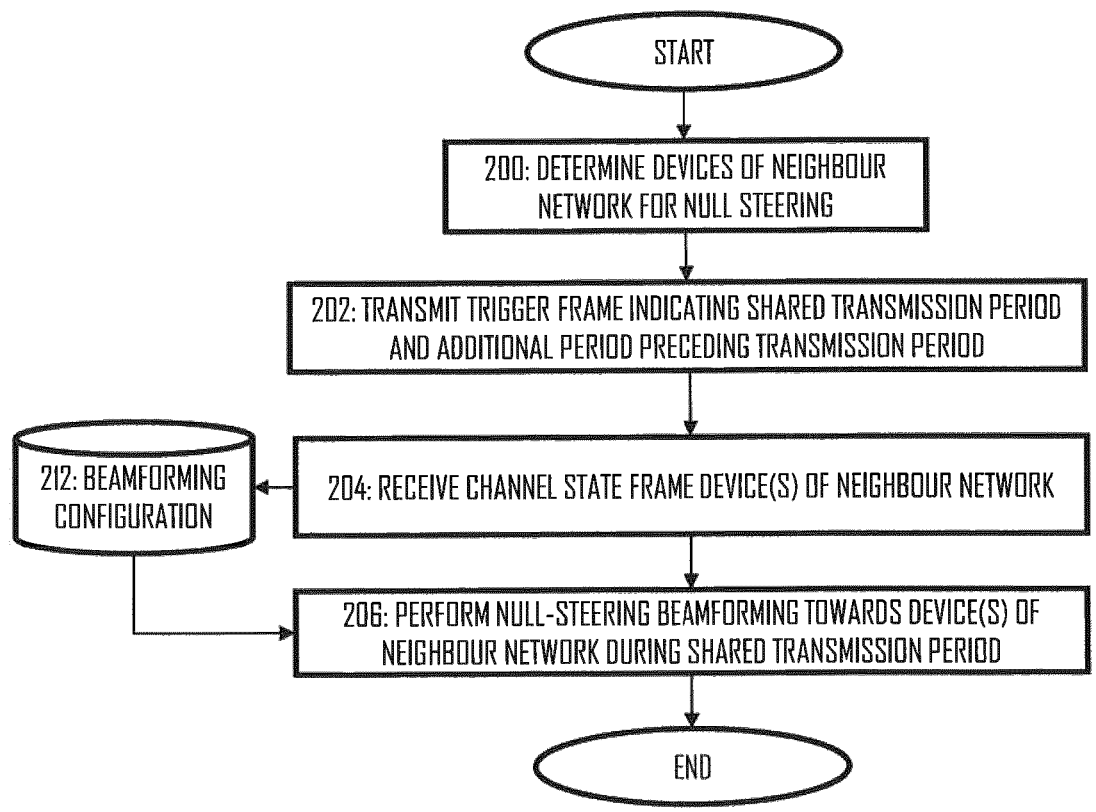

Null steering is a beamforming technique where a transmission null is directed to the undesired directions. For example, the access node 112 may try to steer a transmission null towards the station 102. The null steering may equally be used in reception by steering a reception null towards a direction where undesired signals may be expected. Thus, such undesired signals will not interfere with reception of signals from desired direction(s). Effective use of null steering would require channel state information on a radio channel between the access node 112 and the station 102. Since the station 102 is in an unassociated state with respect to the access node 112, the access node 112 may not acquire the channel state information directly from the station 102. FIGS. 2 to 4 illustrate processes according to some embodiments for performing inter-network beamforming cooperation and sharing a TXOP. FIG. 2 illustrates a process executed in one of the access nodes, e.g. the access node 112, FIG. 3 illustrates a process executed in another access node, e.g. the access node 110, and FIG. 4 illustrates a process executed in a station, e.g. the station 102.

The null steering may be used to enable concurrent transmissions in neighbouring wireless networks. For example, the access node 110 may direct a transmission null towards the station 104 to enable the access nodes 110, 112 to transmit one or more downlink frames concurrently on the same frequency channel. The transmission null ensures that the transmission by the access node 110 will not interfere the station 104, and the station may receive a downlink frame from the access node 112. Because of the mobility of the stations, channel state information used in the null steering as a basis for directing the transmission and/or reception null(s) should be kept up-to-date. FIGS. 2 and 3 illustrate some procedures for acquiring the channel state information.

Referring to FIG. 2, let us describe a process for an access node of a first wireless network, e.g. one of the access nodes 110, 112. The process comprises as performed by the access node: determining (block 200) a plurality of devices of a second wireless network for null steering; transmitting (block 202) a trigger frame, the trigger frame indicating a transmission period for data frame transfer between the apparatus and another apparatus of the first wireless network, a spatial reuse opportunity for the second wireless network during the transmission period, and an additional period preceding the transmission period; receiving (block 204), from at least one device of the second wireless network during the additional period, a channel state frame; and performing (block 206), based on the received channel state frame, null steering towards the at least one device during the transmission period.

The channel state frame received in block 204 may be used for computing a beamforming configuration 212 that defines spatial selectivity of transmissions and/or receptions by the access node. The beamforming configuration may define transmission null(s) that is/are directed towards unassociated stations and, optionally, towards one or more other access nodes, and transmission directions directed towards one or more stations associated to the access node.

FIG. 3 illustrates the channel state information acquisition procedure from the perspective of a station or an access node of the neighbouring network, i.e. a wireless device not associated or belonging to the network of the access node executing the process of FIG. 2. Referring to FIG. 3, the process performed by the wireless device of the neighbouring network comprises: detecting (block 300) the trigger frame transmitted by an access node of the first wireless network, the trigger frame indicating the transmission period for data frame transfer between the access node and the station of the first wireless network, the spatial reuse opportunity for the first wireless network during the transmission period, and the additional period preceding the transmission period; transmitting, (block 302) during the additional period, a channel state frame to the access node; and transferring (block 304) a frame with another apparatus of the second wireless network during the transmission period.

As described above, the additional period is specified to precede the spatial reuse opportunity or, in other words, a shared TXOP, and the additional period is dedicated to acquisition of channel state information from unassociated devices of the overlapping network. Such an additional period enables the access node executing the process of FIG. 2 to update its null steering parameters correctly towards the unassociated devices of the overlapping network that are potential re-users of the shared TXOP. Accordingly, the shared TXOP may be used by multiple networks with reduced inter-network interference.

Said transferring in block 304 may refer to transmission and/or reception of one or more frames.

In an embodiment, the additional period is dedicated to the acquisition of the channel state frame from at least one device of the second wireless network, and the trigger frame indicates a duration of the additional period. The additional period being dedicated to the acquisition of the channel state frame may be considered as that only frames associated with the acquisition of the channel state information can be transmitted during the additional period. The specified duration may start from the transmission/reception of the trigger frame and end after a determined time interval specified by the indicated duration has expired from the transmission/reception of the trigger frame. The trigger frame may comprise an information element explicitly indicating the duration of the additional period.

Conventionally, a station of the neighbouring network not associated to the access node executing the process of FIG. 2 may enter a power-save mode upon when detecting a frame transmitted by the access node on a channel. The frame may trigger channel reservation of the channel for the access node and, since the station is not expecting any frames addressed to it during the reservation, it may enter the power-save mode. For example, in the 802.11 networks the station may determine that the access node has triggered a network allocation vector (NAV) on the channel and, while the NAV is valid, the station cannot access the channel or receive frames addressed to it on the channel. However, a station 102 detecting the trigger frame transmitted by the unassociated access node may prevent, in response to the detection of the trigger frame, entering the power-save mode and, instead of the power-save mode, transmit the channel state frame during the additional period. This exception may apply at least to station(s) intending to employ the shared TXOP but it may apply also to station(s) not intending to employ the shared TXOP. The additional period may thus be used by the access node to update the channel state information for various unassociated stations.

In an embodiment, the access nodes 110, 112 first setup or establish the inter-network beamforming cooperation before the execution of the processes of FIGS. 2 and 3. During the establishment, the station(s) of the wireless networks may be assigned to the inter-network beamforming configuration as well, e.g. on the basis of measurements carried out by the stations. Stations determined (block 200) to potentially suffer from interference from the access node of the neighbouring network may be added to the inter-network beamforming configuration, e.g. interference between the STA 102 and the access node 112 and between the STA 104 and the access node 110. In the station 102, the setup may comprise entering an identifier of the neighbouring access node 112 to a beamforming address set stored in the station 102. The station is thus configured to expect frames not only from the access node(s) to which is has associated but also from that/those access nodes indicated in the beamforming address set. Entering the identifier of the access node 112 to the beamforming address set may be subjected to the station 102 receiving, from the associated access node 110, a beamforming address set update request message comprising an identifier of the unassociated access node 112 with which the associated access node 110 has established the inter-network beamforming configuration. Upon entering the unassociated access node 112 to the beamforming address set, the associated access node 110 may inform the unassociated access node 112 that the station 102 has added the identifier of the unassociated access node 112 to the beamforming address set. As a consequence, the unassociated access node 112 is aware that the station 102 is capable of responding to the frames transmitted by the unassociated access node 112.

In an embodiment where the access node intends to use the shared TXOP for downlink transmission, the trigger frame is a multi-user request-to-send (MU-RTS) frame addressed to at least one device of the first wireless network and at least one of the plurality of devices of the second wireless network determined in block 200. At least a station associated to the access node that transmitted the MU-RTS frame shall respond to the MU-RTS frame by transmitting a clear-to-send (CTS) frame, if the station(s) deem(s) the shared TXOP acceptable. In this embodiment, the channel state frame may comprise a beamforming report comprising channel state information measured by the at least one device of the second wireless network.

Figure 4B:
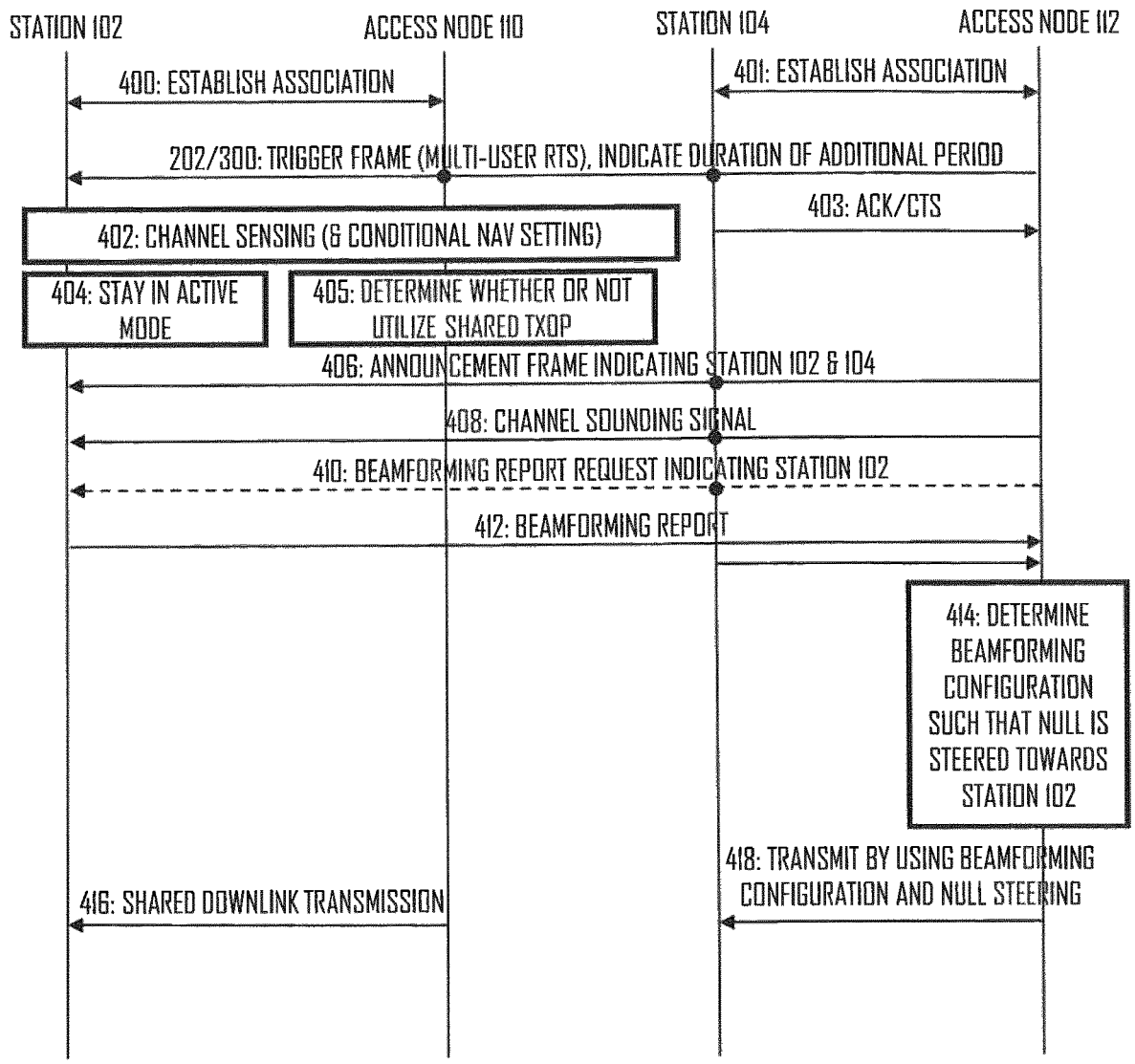

FIG. 4B illustrates a signalling diagram of an embodiment combining the procedures of FIGS. 2 and 3. FIG. 4A illustrates a timing diagram for the procedure of FIG. 4B. The embodiment of FIGS. 4A and 4B relates to sharing a downlink TXOP by the access node 112. In other words, the access node 112 executes an embodiment of the process of FIG. 2, and the station 102 executes an embodiment of the process of FIG. 3. Referring to FIG. 4B, let us assume that the station 102 has established an association to the access node 110 in step 400 and that the station 104 has established an association to the access node 112 in step 401. The association procedure is described above. Accordingly, the station 102 is unassociated with respect to the access node 112, and the station 104 is unassociated with respect to the access node 110. During the association, the access node 112 executes block 200. It also determines to perform a downlink transmission and determines to provide a possibility for a shared TXOP. As a consequence, the access node 112 transmits the trigger frame in step 202. The trigger frame may be the MU-RTS frame addressed to at least the stations 102, 104 and, optionally, also to the access node 110. The trigger frame may comprise an information element indicating the duration of the additional period.

Upon detecting the trigger frame, at least the station 104 associated to the access node 112 may respond to the trigger frame in step 403. The response message may be an acknowledgment (ACK) or, in the case of the trigger frame being the MU-RTS, a CTS message. While the station 104 transmits the response message in step 403, the station 102 and/or the access node 110 may carry out channel sensing or channel measurement (block 402, see also FIG. 4A) and measure a signal strength of a signal received from the station 104. The measured signal strength may be used as a criterion for determining whether or not the station 102 and/or access node 110 interferes the station 104 (block 405). If the measured signal strength is above a determined threshold, the station 102 and/or the access node 110 may determine that, if the shared TXOP would be utilized, interference towards the station 104 would degrade the probability of the station 104 to receive the downlink transmission from the access node 112. If the measured signal strength is below the threshold, the station 102 and/or the access node 110 may determine that the interference, if any, towards the station 104 is on an acceptable level so that the shared TXOP may be utilized.

Additionally, or alternatively, the station may trigger the conditional NAV setting upon detecting the trigger frame. As described above, while the channel is reserved by the unassociated access node 112, the station may remain in an active mode (block 404) to receive further frames from the access node 112.

Steps 202, 402, and 403 may be carried out during a shared TXOP advertising period (see FIG. 4A).

During the following additional period, e.g. the channel state information (CSI) acquisition period of FIG. 4A, the access node 112 may transmit (step 406) an announcement frame indicating the at least one station 102. The announcement frame may additionally indicate the associated station 104. The announcement frame may indicate that the access node intends to perform CSI acquisition with the station 102 (and 104). After transmitting the announcement frame, the access node 112 may transmit (step 408) a channel sounding signal. The station(s) 102, 104 may measure the channel sounding signal, as configured by the announcement frame and generate the CSI. Upon generating the CSI, the station (s) 102, 104 may transmit (step 412) a beamforming report comprising the CSI. In block 414, the access node 112 may then determine a beamforming configuration that directs a transmission null towards the station 102, on the basis of the received CSI. Upon completing the CSI acquisition period and acquiring the CSI at least from the station 102, the shared TXOP starts. The access node 112 may carry out a downlink frame transmission (step 418) to the station 104 such that the beamforming configuration is utilized. Accordingly, transmission null is directed towards the station 102 which means that reduced or negligible radio energy will be directed from the access node towards the direction of the station 102. If the access node 110 determines in block 405 to utilize the shared TXOP, the access node 110 may also carry out a downlink transmission towards the station 102 (step 416). Channel contention may precede the downlink transmission, and the channel contention may be started after the expiry of the CSI acquisition period. If the interference towards the station 104 has been measured and determined to be below the threshold, the access node 110 may determine that the current beamforming configuration or no beamforming configuration is needed in the transmission.

As described above, the beamforming address set stored in the station 102 may comprise an identifier of at least one access node to which the station is not associated. Upon receiving a frame from the at least one access node indicated in the beamforming address set, the station may extract the frame and respond to the frame. For example, upon receiving the announcement frame from the unassociated access node 112 in step 406, the station 102 may, upon detecting that the access node is comprised in the beamforming address set, proceed with measuring and reporting the channel state information. If the announcement frame was received from an access node to which the station is not associated and which is not indicated in the beamforming address set, the station would discard the frame.

In an embodiment the at least one station is indicated in the trigger frame by a medium access control address(es) of the at least one station.

In an embodiment, the transmission of the beamforming report in step 412 is subjected to the access node 112 that transmitted the channel sounding signal transmitting a beamforming report request message (step 410) that triggers the transmission of the beamforming report in step 412. If the beamforming report request is omitted, the transmission of the channel sounding signal in step 408 may serve as the trigger for the transmission of the beamforming report, and all necessary information for transmitting the beamforming report may be provided in the announcement frame and in the channel sounding signal. For example, the announcement frame may indicate the station 102 and, as a consequence, the station 102 acquires the instruction to monitor for the channel sounding signal transmitted by the unassociated access node. Upon detecting the channel sounding signal, the station 102 may measure and generate the channel state information and transmit the beamforming report comprising the channel state information without a separate trigger after the channel sounding signal. An advantage of using the beamforming report request is that the access node may coordinate and schedule the stations to transmit the beamforming reports. However, such a feature is not essential to the general scope of the invention.

In an embodiment, the announcement frame is a null data packet announcement (NDPA) frame of 802.11 specifications. The NDPA frame may indicate stations from which the access node requests channel state information (CSI) and contains information on the requested CSI. In an embodiment, the announcement frame indicates at least one station from the network of the access node 112 transmitting the announcement frame and at least one station from the network of the other access node 110. Below. an example of the NDPA frame is illustrated:

| Control | Duration | RA | TA | Sounding Dialog Token | STA1 | ... | STA N | FCS |
|---|---|---|---|---|---|---|---|---|
| 2 | 2 | 6 | 6 | 1 | 4 | | 4 | 4 |

The number below each item represents the length of the respective item in octets. Frame Control field specifies the type of the frame, and Duration field specifies the duration of the frame. RA is a receiver address, and TA is a transmitter address. The RA may be a medium access control (MAC) address of a target STA in case of unicast transmission, or it may be a broadcast address. When the frame is targeted only to the stations associated to the access node 112, the TA may be a MAC address of the access node 112. When the frame is targeted to one or more unassociated stations, the TA field may comprise a SSID of the access node 112, i.e. an identifier of the wireless network of the access node 112. Alternatively, the TA field may comprise the MAC address of the access node 112 when the frame is targeted to one or more unassociated stations. The Sounding Dialog Token may announce that the frame is a high-efficiency (HE) NDPA frame. The STA1 to STA N fields may identify the N stations that are requested to perform the channel sounding measurements. The stations may comprise stations associated to the access node 112 and/or stations not associated to the access node 112. The table below illustrates an embodiment of contents of the field STA N. Frame Check Sequence (FCS) may be used for error detection/correction.

| AID11 | Partial BW Information | Feedback Type & Ng | Disambiguation | Codebook Size | Nc |
|---|---|---|---|---|---|
| 11 | 14 | 2 | 1 | 1 | 3 |

The number below each item represents the length of the respective item in bits. AID11 contains the least significant bits of an association identifier of the station identified by the field. In this case, 11 least significant bits is used but the number of bits may be different. In another embodiment, the determined number of bits of the association identifier of a station may be combined with an SSID of the access node 110 to which the station is associated so that the identification is globally unique and unambiguous. Partial bandwidth (BW) information field may be used to specify a measurement band in terms of resource units. Disambiguation bit may be set to value '1' for a HE frame. The Feedback Type & Ng and Codebook size sub-fields define the type of channel state information to be determined, such as quantization resolution, single-user/multi-user feedback type, and precoding codebook size.

In an embodiment, the channel sounding signal is a null data packet (NDP) of 802.11 specifications. In an embodiment where the announcement frame is the NDPA frame and the channel sounding signal the NDP, the NDP may be transmitted a short inter-frame space (SIFS) after the NDPA frame. The NDP may carry no payload, i.e. no data field. It may yet comprise training sequence fields to enable the channel measurements and, additionally, one or more signalling fields.

In an embodiment, the beamforming report request is a beamforming report poll (BFRP) trigger frame of 802.11 specifications. In an embodiment where the announcement frame is the NDPA frame, the channel sounding signal is the NDP, and the beamforming report request is the BFRP trigger frame, the access node 112 may transmit the BFRP trigger frame the SIFS after the NDP. The station 102 may then transmit the beamforming report after the SIFS has expired from the reception of the BFRP trigger frame. The channel contention described above may be used for the transmission of the beamforming report.

As described above, the at least one station of the wireless network of the access node 110 may form a subset of stations of a wireless network, e.g. a subset of terminal devices served by the access node 110. For example, the station 100 not within the coverage area of the access node 112 may be omitted from the inter-network beamforming cooperation. One or more stations within the coverage area of the access node 112 may equally be omitted for various reasons, e.g. low battery status.

The indication of the additional period in the trigger frame reserves the channel not only for the TXOP advertising period but also the CSI acquisition period. Accordingly, the devices of the neighbouring network(s) will not start channel contention during the CSI acquisition period and, additionally, are capable of providing the requested beamforming report and the channel state information.

In an embodiment, the indication of the additional period in the trigger frame is implicit, and a dedicated information element for the indication may be omitted. For example, the trigger frame indicating the shared TXOP may also directly imply the presence of the additional period.

In embodiments where the trigger frame indicates the duration of the additional period, the access node may compute the duration by using one or more of the following parameters: whether the shared TXOP is for uplink or downlink, a speed of the CSI acquisition, e.g., whether the CSI acquisition is explicit or implicit, a total number of (unassociated and associated) stations involved in the CSI acquisition period; a resolution of a precoding codebook, and a tone grouping factor of 802.11 specifications, etc.

As described above, the station 102 may, upon reception of the trigger frame indicating the shared TXOP and, optionally, addressed to the station 102, delay the start of such spatial reuse opportunity by the duration of the additional period. Additionally, the station may, regardless of whether it intends to exploit the shared TXOP, stay in the active mode (block 404) and keep receiving further frames from the access node 112 that advertised the shared TXOP and, thus, avoid entering the power-save mode.

Figure 5:
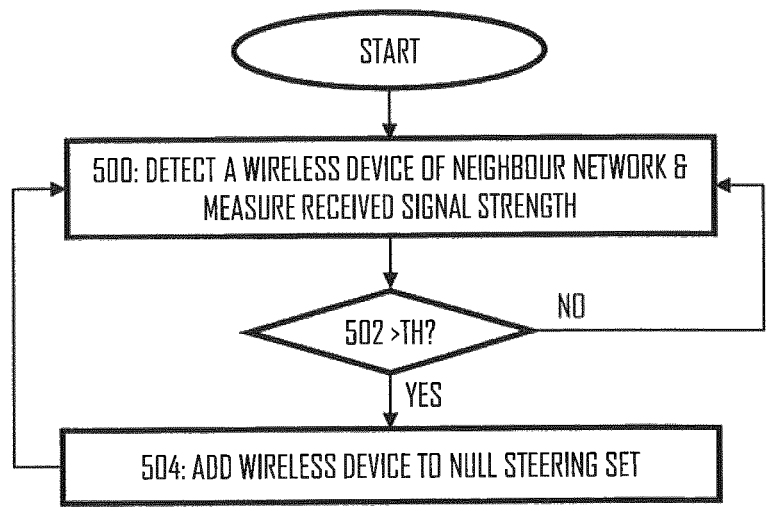
FIG. 5 illustrates a procedure for adding a wireless device to a null steering set according to an embodiment.

In an embodiment, the plurality of devices of the second wireless network are determined in block 200 based on inter-network measurements. FIG. 5 illustrates a procedure for performing the inter-network measurements. Referring to FIG. 5, upon detecting a frame transmitted by a wireless device of a neighbouring wireless network in block 500, the access node may measure a signal strength of the frame. If the signal strength is determined in block 502 to be above a threshold, the wireless device may be added to a null steering set of devices in block 504. Otherwise, the process may end or return to block 500 for detection of a next wireless device or a new measurement for the same wireless device. Execution of block 504 may trigger determining whether or not a wireless network of the wireless device is readily in the beamforming cooperation. If not, the access node may trigger establishment of the beamforming cooperation with an access node of the wireless network and, optionally, configuring the wireless device to enter the access node to its beamforming address set. If the wireless network of the wireless device is readily in the beamforming cooperation, the wireless device may be added to a set of devices to which the trigger frame shall be addressed.

Figure 6A:
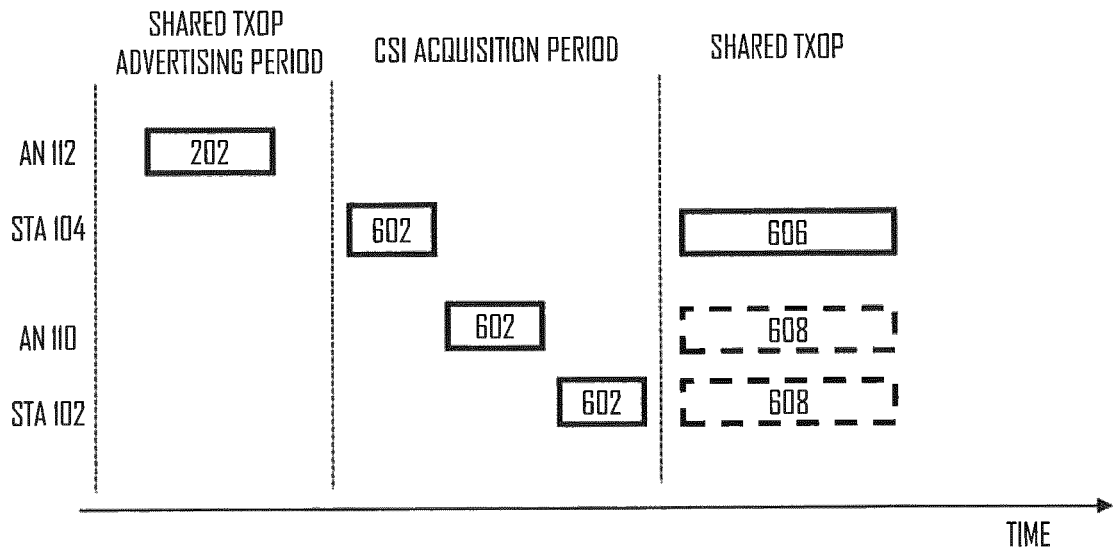
FIGS. 6A and 6B illustrate an embodiment for acquiring the channel state information for a shared transmission opportunity related to uplink.
Figure 6B:
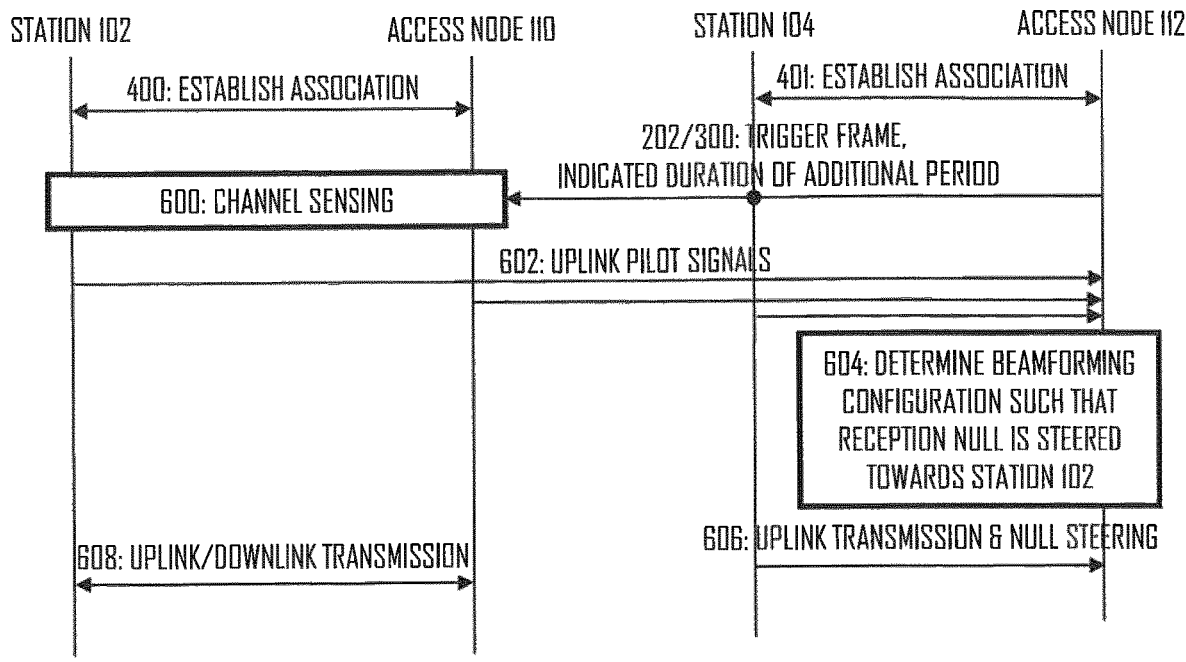

In the embodiment of FIGS. 4A and 4B, the trigger frame indicated downlink transmission where the channel state frame comprises the beamforming report (step 412). In another embodiment, the trigger frame indicates uplink transmission for the transmission period, and the channel state frame comprises an uplink pilot signal. FIGS. 6A and 6B illustrate a procedure according to such an embodiment. The same reference numbers as in the previous Figures represent the same or substantially similar operations or functions.

Referring to FIG. 6B, the associations may be established in steps 400 and 401, as described above. In this embodiment, the trigger frame transmitted by the access node 112 in step 202 indicates the uplink transmission for the shared TXOP. The trigger frame may also indicate the duration of the additional period. The trigger frame may be addressed to at least some of the station(s) 104, 106 associated to the access node 112 and, additionally, to the devices 110, 102 of the neighbour network with which the beamforming cooperation has been set up. The station 102 and the access node 110 may, upon detecting the opportunity for shared TXOP indicating uplink transmission, measure a signal strength of the trigger frame (block 600) and determine an interference level towards the access node 112. The measuring performed in block may be used by the access node 110 and/or the station to determine an interference level towards the access node in the case where the shared TXOP would be utilized. The interference level may be used as a criterion for determining whether or not to utilize the shared TXOP. If the measured signal strength is above an interference threshold, the access node 110 and/or the station 102 may refrain from utilizing the shared TXOP. If the measured signal strength is below the interference threshold, the shared TXOP may be utilized with the knowledge that the access node 112 is capable of suppressing interference from the access node 110 and/or the station 102 by using the null steering. The trigger frame may comprise an information element indicating an interference threshold, and the device 102 and/or 110 may then determine on the basis of measured interference level with respect to the interference threshold whether or not to exploit the shared TXOP. If the measured interference level is below the interference threshold, the shared TXOP can be exploited.

In this embodiment, the shared TXOP advertising period may consist of the trigger frame and, optionally, a subsequent acknowledgment frame. The wireless devices addressed by the trigger frame may then transmit, during the CSI acquisition period, uplink pilot signals in step 602. The station 102, 104 and/or the access node 110 may include the pilot signal into a physical layer convergence protocol (PLCP) header of a transmitted frame. The pilot signal may be comprised in an Extremely High Throughput (EHT) null data packet, e.g. in an EHT Long Training Field. Channel contention may precede the transmission of the uplink pilot signal, so the transmissions by the devices 102, 104, 110 may occur at different timings, as illustrated in FIG. 6A.

Upon receiving a pilot signal from the stations 102, 104 (and 110) and from the access node 110, the access node 604 may compute the beamforming configuration in block 604. In this case of uplink shared TXOP, the access node may compute the beamforming configuration such that a reception null is directed towards the station 102 and the access node 110, and high reception directivity is directed towards the station(s) 102, 110. Accordingly, concurrent transmissions by the station 102 and/or 110 will not interfere the reception of uplink frames from the stations 104, 110 in step 606.

The concurrent transmission in step 608 may comprise uplink transmission and/or downlink transmission. The uplink transmission in step 608 may be based on the station 102 performing channel contention, or the uplink transmission may be scheduled by the access node 110. In the case of channel contention, it is sufficient that only the station 102 has detected the opportunity for the shared TXOP and decided to exploit the opportunity. However, both the station 102 and the access node 110 may perform the channel contention for the transmission in step 608, and the device winning contention will exploit the shared TXOP. In the case of the scheduled uplink transmission, both the access node and the station 102 may have to have recognized the opportunity, e.g. on the basis of the measurement in block 600.

The trigger frame may comprise at least some of the same information element described above in connection with FIGS. 4A and 4B.

When the number of stations involved in the beamforming cooperation increases, there is potential for inefficiency in the allocation of the additional period and, in general, in the placement of the nulls. Additionally, the access nodes 110, 112 may be capable of creating a limited number of nulls. Therefore, it would be advantageous to determine, before carrying out frame transmissions with the null steering, the devices having an actual need for the null steering.

Figure 7:
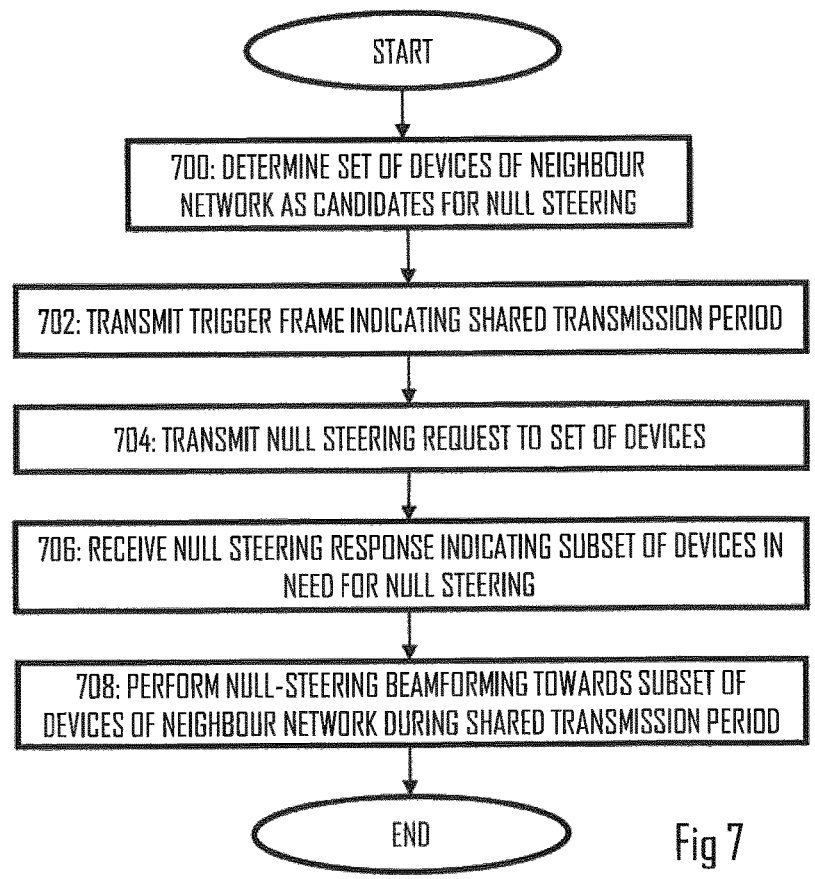
FIGS. 7 and 8 illustrate some embodiments of processes for limiting devices involved in null steering.
Figure 8:
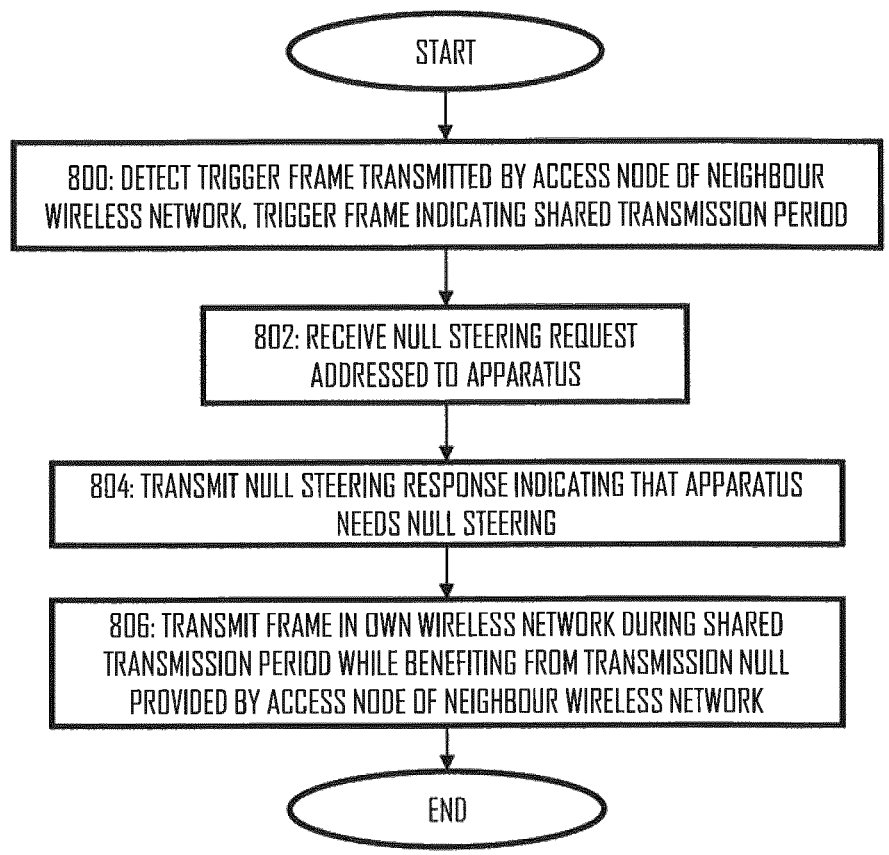

FIGS. 7 and 8 illustrate embodiments of a procedure for improving the efficiency of the null steering. FIG. 7 illustrates the procedure from the perspective of the access node 110 or 112 that intends to perform the null steering during a shared TXOP, and FIG. 8 illustrates the procedure from the perspective of a device that is aimed to benefit from the null steering during the shared TXOP. Referring to FIG. 7, the procedure comprises as performed by an apparatus for the access node of a first wireless network, e.g. the access node 112: determining (block 700) a first set of devices of a second wireless network as potential target devices for null steering; transmitting (block 702) a trigger frame, the trigger frame indicating a transmission period for data frame transfer between the apparatus and another apparatus of the first wireless network, and further indicating a shared transmission opportunity for the second wireless network during the transmission period; transmitting (block 704) a null steering request to one or more devices of the first set; receiving (block 706) at least one null steering response as a response to the null steering request, wherein the at least one null steering response indicates a subset of the first set of devices, the subset having a need for null steering; and performing (block 708), during the transmission period, null steering towards the at least one of the plurality of the devices from which the at least one null steering response was received.

Referring to FIG. 8, the procedure comprises as performed by an apparatus for the device of the second wireless network, e.g. the station 102 or the access node 110: detecting (block 800) a trigger frame transmitted by the access node of the first wireless network, the trigger frame indicating the transmission period for data frame transfer between the access node and a station of the first wireless network, and further indicating a shared transmission opportunity for the second wireless network during the transmission period; receiving (block 802) a null steering request addressed to the apparatus and transmitted by the access node; transmitting (block 804) a null steering response as a response to the null steering request, wherein the null steering response indicates that the apparatus has a need for null steering by the access node; and communicating (block 806) a frame with another apparatus of the first wireless network during the transmission period.

In an embodiment, the first set of devices is determined in block 700 based on inter-network measurements. The procedure of FIG. 5 may be employed in the determination.

Figure 9A:
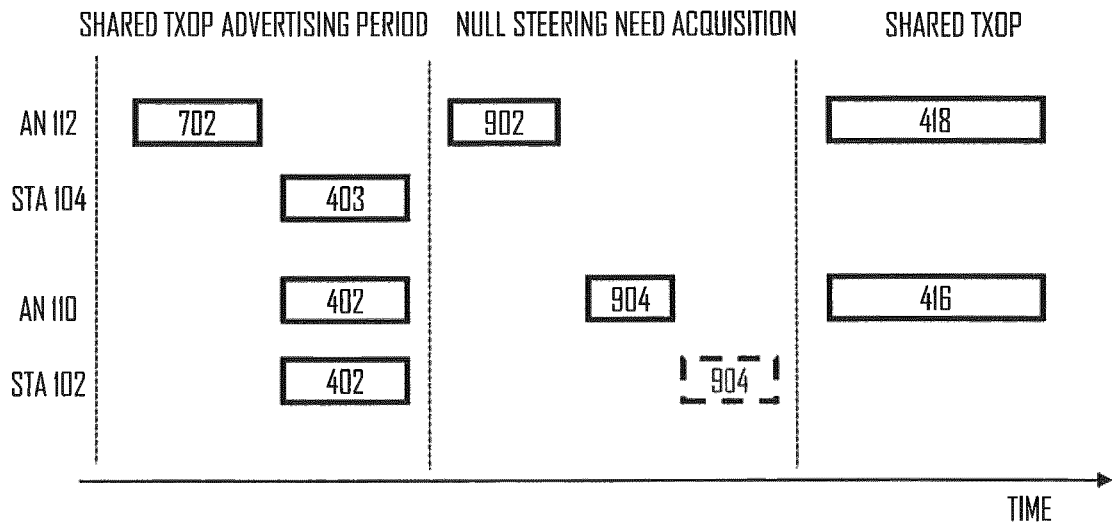
FIGS. 9A and 9B illustrate an embodiment for limiting a number of devices involved in null steering for a shared transmission opportunity related to downlink.
Figure 9B:
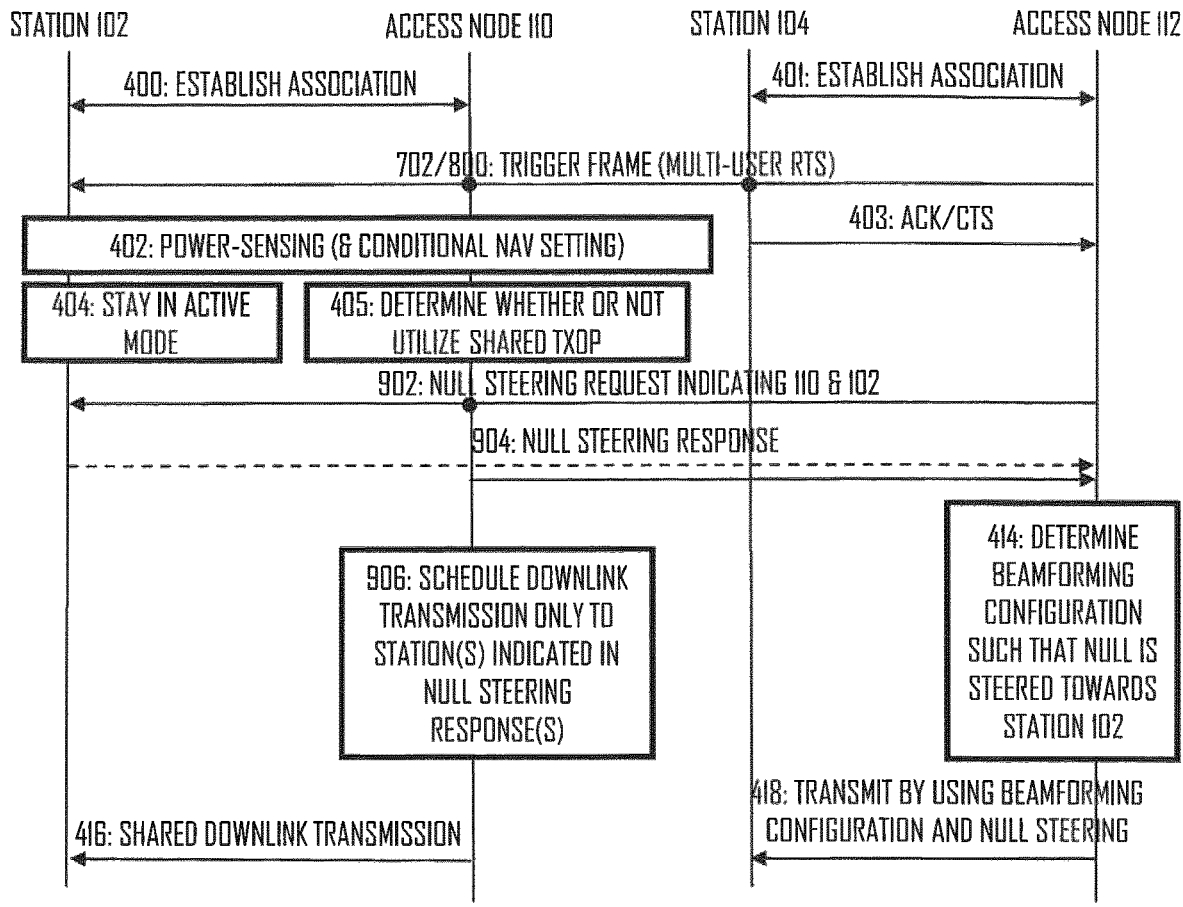

FIG. 9B illustrates a signalling diagram of an embodiment combining the procedures of FIGS. 7 and 8. FIG. 9A illustrates a timing diagram for the procedure of FIG. 9B. The embodiment of FIGS. 9A and 9B relates to sharing a downlink TXOP by the access node 112 and filtering the first set of devices determined in block 700 for the null steering purposes. The access node 112 executes an embodiment of the process of FIG. 7, and the station 102 and/or the access node 110 executes an embodiment of the process of FIG. 8. Referring to FIG. 9B, let us again assume that the station 102 has established an association to the access node 110 in step 400 and that the station 104 has established an association to the access node 112 in step 401. During the association, the access node 112 determines to perform a downlink transmission and determines to provide a possibility for a shared TXOP. As a consequence, the access node 112 transmits the trigger frame in step 702. The trigger frame may be the MU-RTS frame addressed to at least the stations 102, 104 and, optionally, also to the access node 110.

In this embodiment, the trigger frame is a multi-user request-to-send frame is transmitted before the null steering request.

The procedure carried out in steps 402 to 405 may be substantially similar to that of FIG. 4B, and the trigger frame addressed to the station 102 may cause the station 102 to prevent from entering the power-save mode (block 404).

In step 902, the access node 112 transmits the null steering request frame indicating at least the access node 110 and the station 102. The null steering request frame may be addressed to multiple stations associated to the access node 110 and determined by the access node 112 to be the candidates for the null steering (block 700).

The null steering request may also comprise an allocation of a transmission resource to each addressed device. In the embodiment based on the 802.11 specifications, there may be at most nine transmission resource units per 20 MHz channel and, thus, the access node 112 may address nine devices of the network of the access node 110 per 20 MHz channel. If more devices need to be addressed, the access node 112 may generate and transmit multiple null steering request frames.

In step 904, at least the access node 110 that has determined to exploit the opportunity for the shared TXOP responds to the null steering request by transmitting a null steering response in a transmission resource indicated to the access node 110 in the null steering request. The access node 110 may have determined to transmit a downlink frame to the station 102 during the shared TXOP and, thus, the access node 110 may indicate the station 102 in the null steering response. Accordingly, the access node 112 receiving the null steering response becomes aware that the station 102 has a need for null steering and that a transmission null shall be directed towards the station. The access node 112 then computes the beamforming configuration (block 414), on the basis of a latest CSI frame received from the station, which configures a transmission null towards the station 102. In block 906, the access node 110 schedules a downlink transmission to the station(s) indicated in the null steering response, i.e. at least the station 102, and transmits one or more downlink frames during the shared TXOP in step 416.

In an embodiment, the station 102 also transmits a null steering response in a transmission resource indicated to the station 102 in the null steering request. The station 102 may determine to attempt uplink transmission and, thus, indicate in the null steering response that the access node 110 has a need for the null steering. In such a case, the access node 112 may direct a transmission null towards both the access node 110 and the station 102. The access node 110 and the station 102 may then carry out channel contention to determine which one of them gains the channel access.

In an embodiment, the null steering response comprises only an indication that the null steering is needed for a specific device. A device not needing the null steering may thus omit the transmission of the null steering response. In another embodiment, the null steering response contains an information element indicating whether or not the null steering is needed. In such an embodiment, every device addressed by the null steering request may transmit the null steering response. In yet another embodiment, the null steering response contains further information such as a priority class defining the priority of the need for the null steering, transmission data buffer status information. The type and amount of information provided in the null steering response may be previously agreed and configured, e.g. during the establishment of the inter-network beamforming cooperation.

In an embodiment of block 414, the access node 112 may limit the number of transmission nulls to a subset of the devices that have a need for the null steering, as indicated by received null steering responses. For example, if the access node 112 is capable of establishing four transmission nulls and the null steering responses indicate that six devices need the null steering, the access node 112 may select, on the basis of the received channel state frames, four of the devices most susceptible to the interference from the access node 112 for the null steering and steer the transmission nulls only towards the selected devices.

In yet another embodiment where the shared TXOP is employed for uplink transmission in the network of the access node 110, the access node 110 may transmit the null steering response indicating that the access node 110 has a need for null steering. The access node 110 may be aware of a transmission buffer status of the station 102 and, thus, indicate the need for the null steering to allow the station 102 to transmit an uplink transmission during the shared TXOP.

Figure 10A:
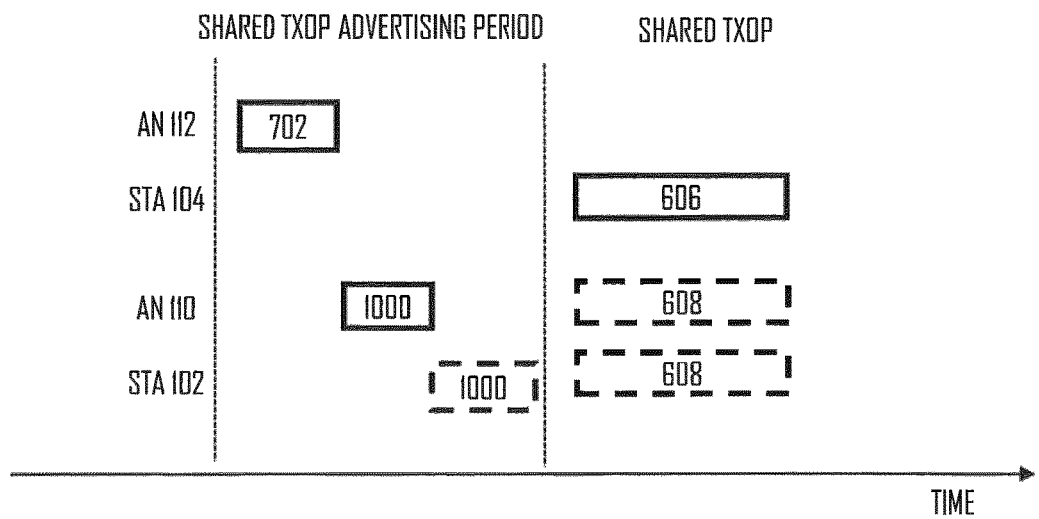
FIGS. 10A and 10B illustrate an embodiment for limiting a number of devices involved in null steering for a shared transmission opportunity related to uplink.
Figure 10B:
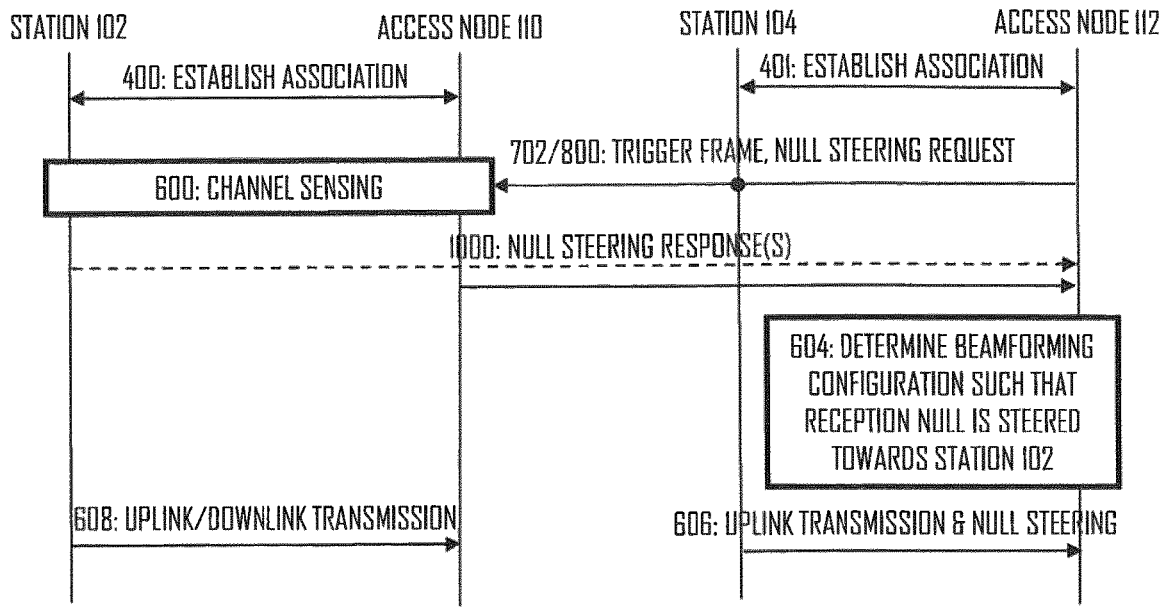

FIGS. 10A and 10B illustrate a signalling diagram of another embodiment combining the processes of FIGS. 7 and 8. In this embodiment, the access node 112 intends to allow a shared TXOP in the context of uplink transmission. In the embodiment of FIGS. 10A and 10B, the trigger frame transmitted in step 702 and received in step 800 indicates uplink transmission for the transmission period, and the null steering request is comprised in the trigger frame. Again, the null steering response may be addressed to multiple devices of the network of the access node 110. The devices 102, 110 may measure the trigger frame in block 600 and determine whether or not to exploit the shared TXOP, e.g. on the basis of the above-described interference threshold received in the trigger frame.

Upon determining to exploit the shared TXOP for uplink transmission, the access node 110 may determine, e.g. on the basis of information on the transmission buffer status of the station 102, to transmit a null steering response indicating that the station 102 shall utilize the shared TXOP. In an embodiment, the station 102 may additionally or alternatively transmit the null steering response to indicate the intention to transmit a frame during the shared TXOP. As in the embodiment of FIGS. 9A and 9B, the null steering request may specify a dedicated transmission resource to each device addressed in the null steering request, and the null steering responses (step 1000) shall be transmitted in the dedicated resource(s). Accordingly, the access node is capable of computing a beamforming configuration where a reception null is directed towards the station 102, and the shared TXOP may be utilized for concurrent frame transmission by the stations 102, 104.

As in the embodiment of FIGS. 6A and 6B, step 608 may comprise uplink and/or downlink transmission. In the case where the access node 110 intends to utilize the shared TXOP for downlink transmission that is concurrent with the uplink transmission in step 606, the access node may indicate the access node 110 in the null steering response. Accordingly, the access node 112 may steer a reception null towards the access node 110 when receiving the uplink transmission in step 606.

As described above, the null steering response(s) received in steps 904 and/or 1000 may indicate a subset of the devices determined in block 700 and/or a subset of devices addressed by the null steering request(s). The access node 112 may further determine a subset of that subset to be eligible for the null steering.

Figure 11A:
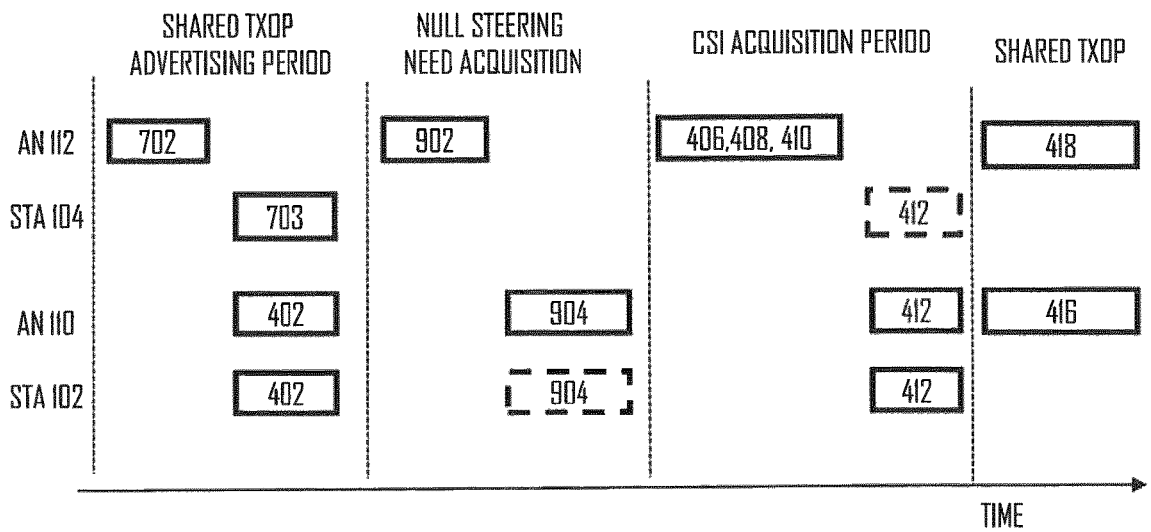
FIGS. 11A and 11B illustrate an embodiment for combining the embodiments of FIGS. 4B and 9B.
Figure 11B:
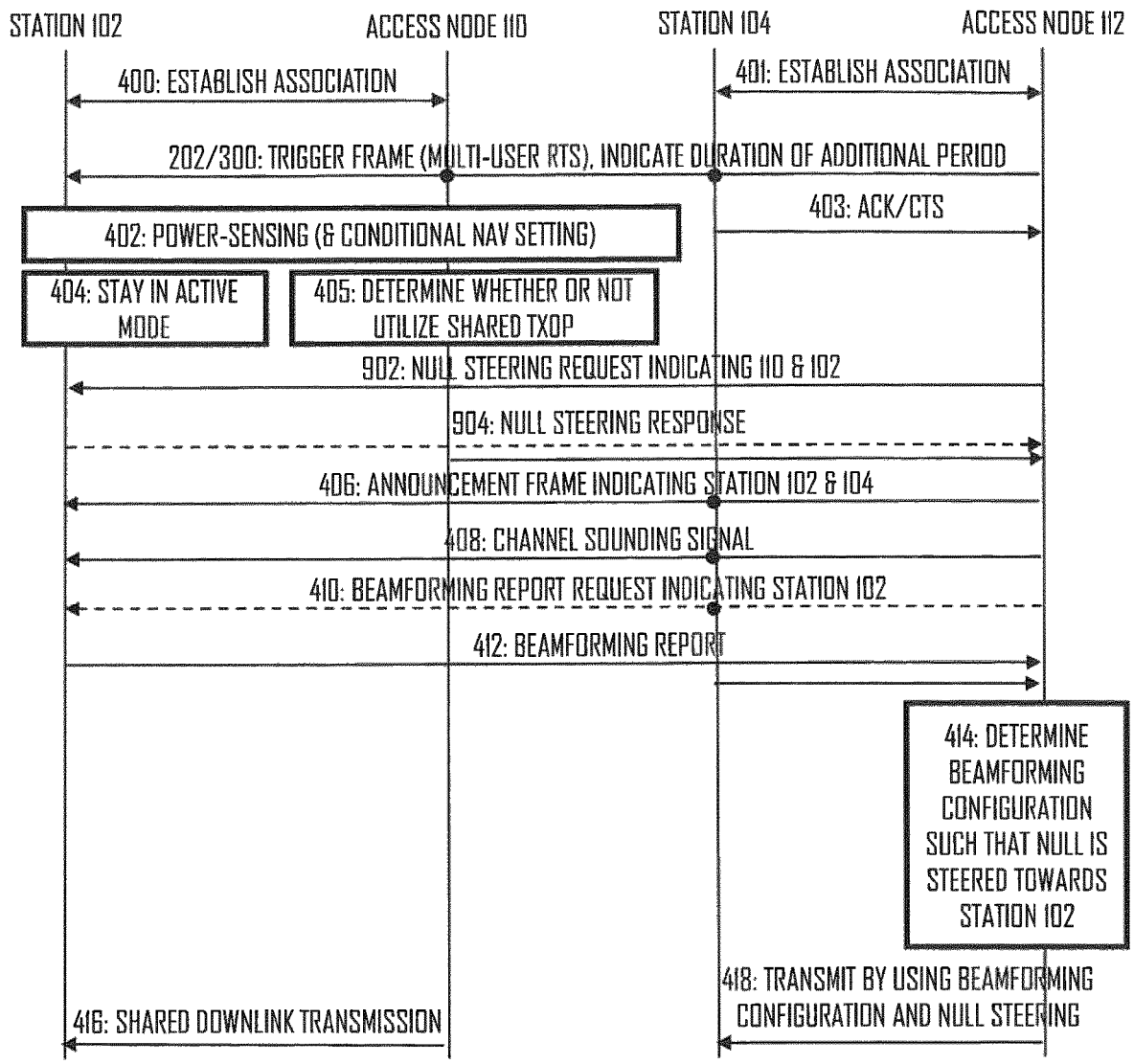
Figure 12A:
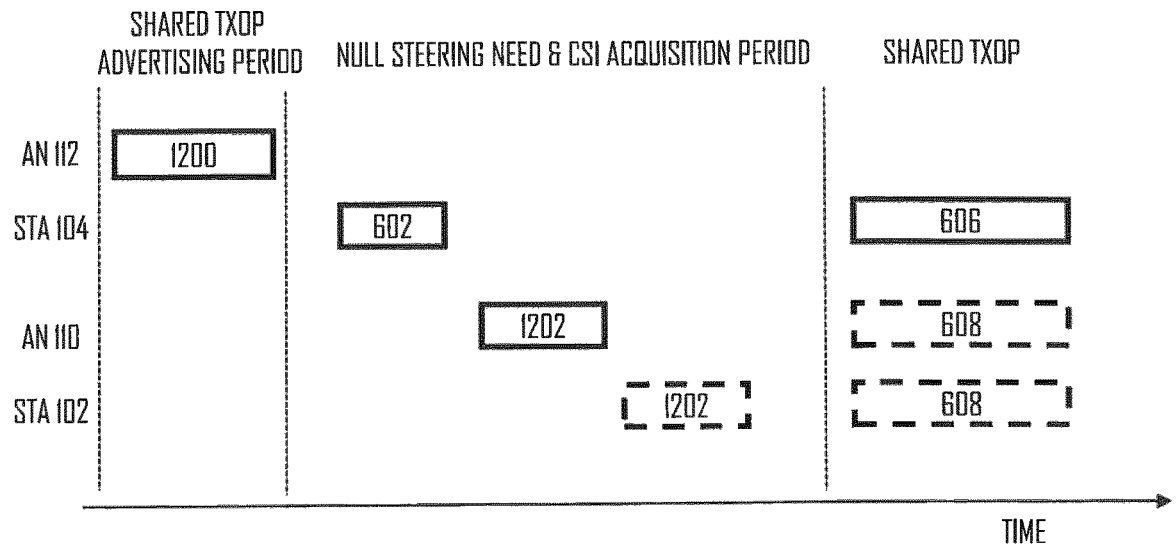
FIGS. 12A and 12B illustrate an embodiment for combining the embodiments of FIGS. 6B and 10B.
Figure 12B:
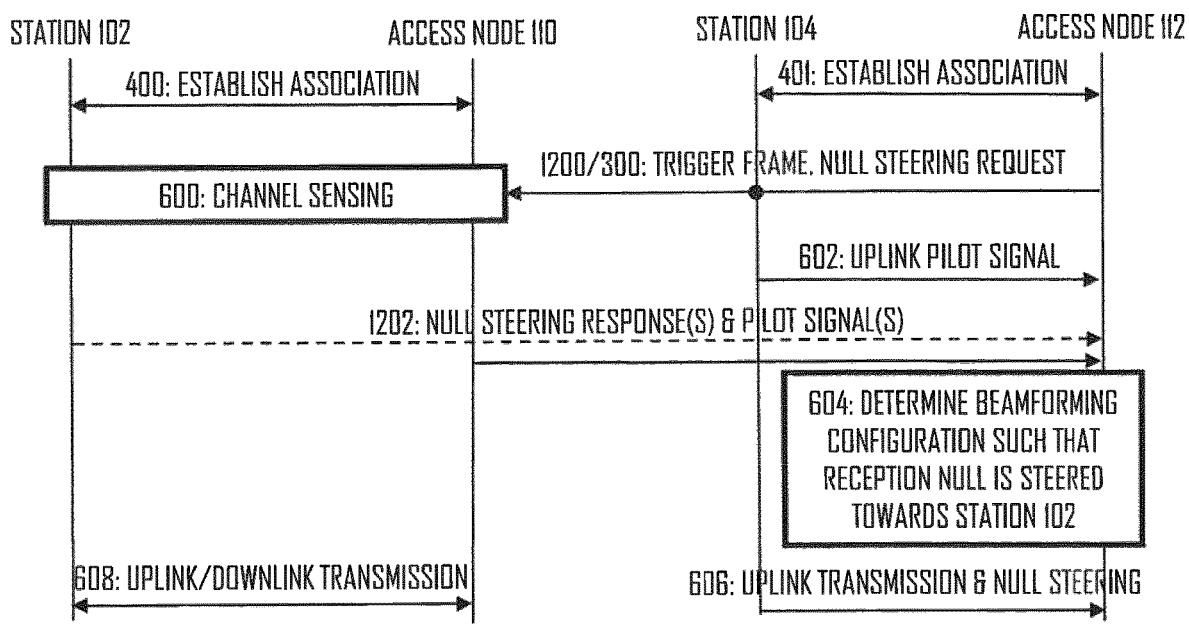

The embodiments related to the null steering request may be combined with the embodiments related to the additional period for the CSI acquisition. FIGS. 11A and 11B illustrate such a procedure for a downlink scenario while FIGS. 12A and 12B illustrate such a procedure for an uplink scenario.

Referring to FIGS. 11A and 11B, the procedure may start with the access node transmitting the trigger frame that may the MU-RTS frame described above. The trigger frame may indicate the shared TXOP for downlink transmission by the access node 112, and it may also indicate the duration of the subsequent CSI acquisition period. In this case, the additional period may comprise the null steering need acquisition period and the CSI acquisition period, and the duration may indicate the aggregated duration of these two periods. Steps 402 to 405 may be carried out in the above-described manner. In step 902, the access node 112 transmits the null steering request and receives the null steering response(s), as described above in connection with FIG. 9B.

The null steering need acquisition period may precede the CSI acquisition period so that the access node 112 may first gather information on the devices to which address the announcement frame in step 406. The announcement frame may be addressed to the station 104 to which the access node 112 intends to transmit a downlink frame in step 418 and, additionally, to one or more devices that have been indicated to be in need for the null steering by the received null steering response frame(s). Let us assume that the access node intends to utilize the shared TXOP to transmit a downlink frame to the station 102 and, as a consequence, the null steering response(s) transmitted by the access node 110 and/or the station 102 indicate that the station 102 has a need for null steering. Therefore, the access node 112 addresses the announcement frame to the station 102 in step 406, and the station 102 measures the channel sounding signal received in step 408 and generates the beamforming report in step 412. The access node may then direct the transmission null towards the station in step 418 while transmitting a downlink frame to the station 104 in step 418, and the access node 110 is able to utilize the shared TXOP to transmit a concurrent downlink frame to the station 102 in step 416.

In another embodiment, the trigger frame transmitted in step 202 comprises the null steering request. Accordingly, step 902 may be omitted and the null steering need acquisition period may consist of the transmission(s) of the null steering response(s).

Referring to FIGS. 12A and 12B, the trigger frame transmitted by the access node 112 in step 1200 may indicate shared TXOP for uplink transmission and, additionally, comprise the null steering request addressed to the set of devices of the network of the access node 110. The access node 110 and/or the station 102 may, based on the channel sensing in block 600 determine whether or not to exploit the opportunity for the shared TXOP. Let us assume that the access node 110 determines to utilize the shared TXOP, the access node 110 and/or the station 102 may indicate, in the null steering response(s) in step 1202, one or more devices that need the null steering. A device in the need for the null steering may include a pilot signal in the null steering response in step 1202. In another embodiment, every device transmitting the null steering response includes the pilot signal in the null steering response frame so that the access node may acquire up-to-date CSI information. The station 104 may respond to the trigger frame by transmitting the CSI frame comprising the uplink pilot signal (step 602). Thereafter, steps 604, 606, and 608 may be carried out in the above-described manner.

Embodiments of the FIGS. 12A to 12B provide the advantages of the additional CSI acquisition period to update the CSI at the access node 112 generating the transmission/reception nulls, and improving the efficiency in the null steering by directing the null(s) only to those device(s) that has/have a need for the null steering.

In the embodiments where the access node 112 receives frames from both associated and unassociated devices, such uplink frames may be preceded by the above-described trigger frame(s) from the access node 112. Since multiple devices take part in such uplink transmission, power pre-correction by the transmitting (associated and/or unassociated) devices may be used to mitigate synchronization and interference issues at the access node 112. In an embodiment, the access node 112 provides power pre-correction parameters in the trigger frame.

Figure 13:
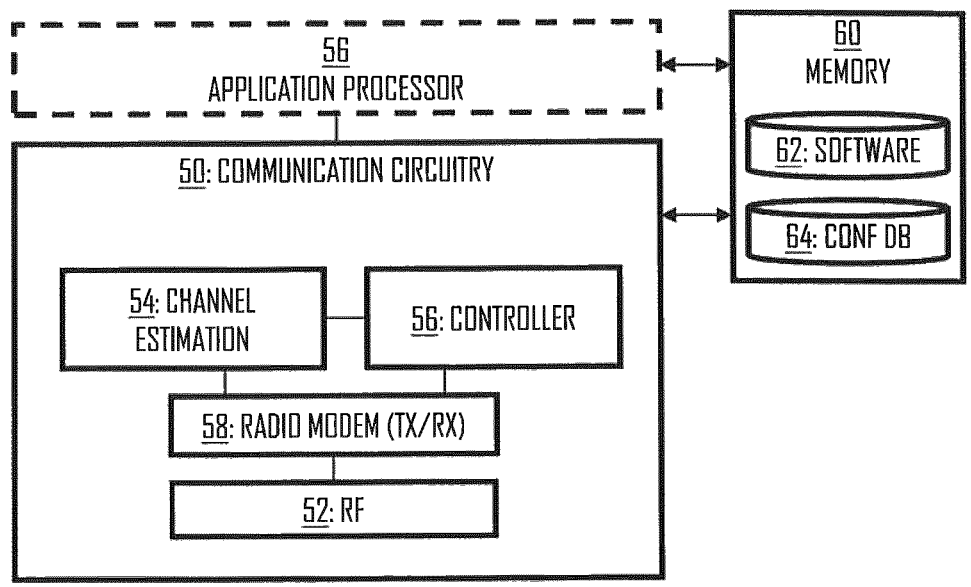
FIGS. 13 and 14 illustrate block diagrams of structures of apparatuses according to some embodiments of the invention.

FIG. 13 illustrates an embodiment of a structure of the above-mentioned functionalities of an apparatus executing the functions of the station 102 or the access node 110 in the process of FIG. 3, 8, or any one of the embodiments described above for the station 102 or for the access node 110. The apparatus may be an access node, a terminal device or a client device of a wireless network, e.g. the 802.11 network. In other embodiments, the apparatus may be a circuitry or an electronic device realizing some embodiments of the invention in such a wireless device. The apparatus may comply with 802.11 specifications. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 13, the apparatus may comprise a communication circuitry 50 providing the apparatus with capability of communicating in the wireless network of the access node 110. The communication circuitry 50 may comprise a radio interface 52 providing the apparatus with radio communication capability. The radio interface 52 may comprise radio frequency converters and other radio frequency components such as an amplifier, filter, and frequency-converter circuitries and one or more antennas. The station entity 50 may further comprise a radio modem 58 configured to carry out transmission and reception of messages in the wireless network. The radio modem 58 may comprise encoder and decoder circuitries, modulator and demodulator circuitries, etc.

The communication circuitry 50 may further comprise a channel estimation circuitry 54 configured to measure a signal strength from a received radio signal and to determine other channel state information such as precoding parameters for the beamforming, as described above. The channel estimation circuitry 54 may be configured to measure the channel sounding signal received in step 408 and to generate the channel state information to be transmitted in step 412.

The communication circuitry 50 may further comprise a controller 56 configured to control transmissions and functions of the apparatus. The controller 56 may, for example, control the establishment of the association in step 400, to control the channel estimation circuitry 54 to perform the channel estimation, and to determine whether or not to exploit the shared TXOP indicated by the received trigger frame. The controller 56 may also control the radio modem 58 to respond to the null steering request received from an access node 112 to which the apparatus is not currently associated. The communication controller 50 may comprise at least one processor comprising the controller 56 and the channel estimation circuitry 54 and, optionally, at least some of the circuitries of the radio modem 58.

In at least the embodiments where the apparatus executes functions of the station 102, the apparatus may further comprise an application processor 56 executing one or more computer program applications that generate a need to transmit and/or receive data through the communication circuitry 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may, for example, store the beamforming address set, parameters for the inter-network beamforming cooperation, etc.

Figure 14:
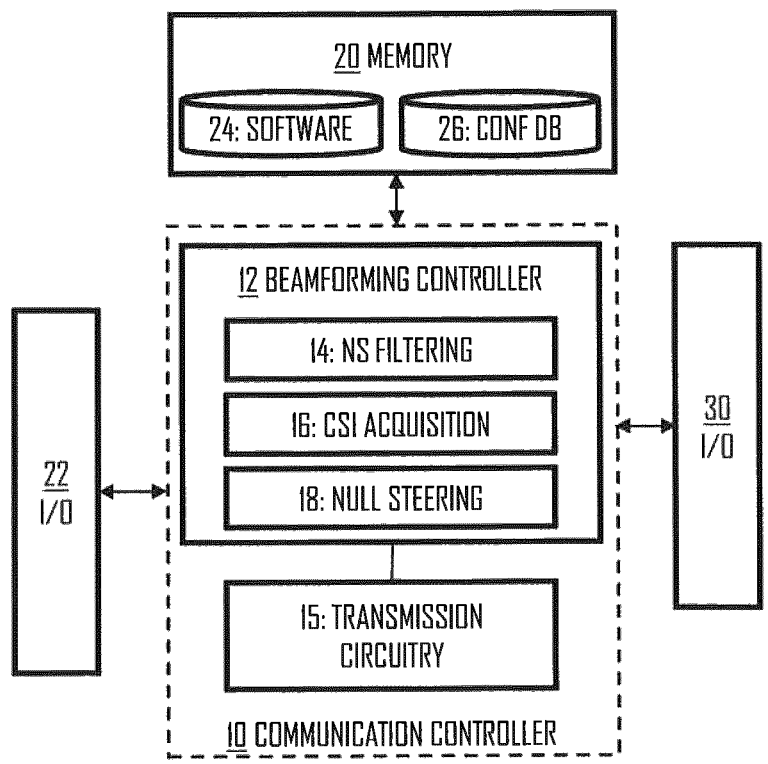

FIG. 14 illustrates an embodiment of a structure of the above-mentioned functionalities of an apparatus executing the functions of the access node 112 in the process of FIG. 2 and/or FIG. 7 or any one of the embodiments described above for the access node 112. In an embodiment, the apparatus is the access node 112. In another embodiment, the apparatus carrying out the above-described functionalities of the access node 112 is comprised in such a device, e.g. the apparatus may comprise a circuitry, e.g. a chip, a chipset, a processor, a micro controller, or a combination of such circuitries in the access node. The apparatus may be an electronic device comprising electronic circuitries for realizing some embodiments of the access node.

Referring to FIG. 14, the apparatus may comprise a first communication interface 22 or a communication circuitry configured to provide the apparatus with capability for bidirectional communication with stations and other access nodes over a radio interface. The communication interface may comprise radio frequency circuitries for processing received control frames and data frames and control frames and data frames to be transmitted. The communication interface 22 may comprise standard well-known components such as an antenna array, amplifier, a filter, a frequency converter, and encoder/decoder circuitries.

The apparatus may further comprise a second communication interface 30 or a communication circuitry configured to provide the apparatus with capability for bidirectional communication with other networks, e.g. the Internet or another computer network. In some embodiments, the communication interface 30 is used for the communication between the access nodes 110, 112. In other embodiments, the access nodes communicate over a radio interface through the communication interface 22. The communication interface 30 or 22 may comprise circuitries for processing messages described above in connection with one or more of the steps 202, 403, 406 to 412, 418, 602, 606, 702, 902, 904, 1000, 1200, 1202. The communication interface 22 may comprise standard well-known components such as an amplifier, a filter, and encoder/decoder circuitries.

The apparatus may further comprise a memory 20 storing one or more computer program products 24 configuring the operation of at least one processor 10 of the apparatus. The memory 20 may further store a configuration database 26 storing operational configurations of the apparatus, e.g. channel state information received from the stations and the beamforming configuration 212, 312.

The apparatus may further comprise the at least one processor 10 configured to carry out the process of FIG. 2 or any one of its embodiments, or the process of FIG. 7 or any one of its embodiments. The processor may comprise a communication controller controlling the operation of the access node. Referring to FIG. 14, the processor(s) 10 comprise(s) a beamforming controller 12 and a transmission circuitry 15. The transmission circuitry 15 may carry out frame transmissions in a wireless network managed by the apparatus. The frame transmissions may include transmissions of frames to stations associated to the apparatus in which case the transmission circuitry may employ the beamforming configuration 212, 312 currently stored in the configuration database 26. The frame transmissions may include the setup of the beamforming cooperation, as described above. In such a case, the transmission circuitry 15 may employ a beamforming configuration that does or does not use the null steering, e.g. omnidirectional transmission.

The beamforming controller 12 may comprise a null steering filtering circuitry configured to carry out the process of FIG. 7 in order to determine devices that are in a need for direction a transmission/reception null towards them. For the generation of the beamforming configuration, the beamforming controller 12 may comprise a channel state information (CSI) acquisition circuitry 16 configured to select stations to be involved in the CSI acquisition, control the duration of the CSI acquisition period and transmission of the announcement frame(s) and, optionally, the beamforming report request. Upon receiving the beamforming reports from the devices, a null steering circuitry 18 may compute the beamforming configuration such that transmission null(s) is/are directed towards unassociated devices that need the null steering and transmission energy is directed towards associated stations to which transmission/reception occurs. The null steering circuitry 18 may then store the beamforming configuration in the configuration database 26.

It should be appreciated that the apparatuses of FIGS. 13 and 14 have been described in the context of their roles in the described embodiments. Therefore, the access nodes 110 and 112 may both comprise the circuitries described in FIG. 14 and those circuitries described in connection with FIG. 13 with respect to the embodiment where the apparatus of FIG. 13 is for the access node 110.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 12B may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a first wireless network, comprising:
   at least one processor; and
   at least one non-transitory memory including computer program code,
   the at least one non-transitory memory and the computer program code configured to, with the at least one processor, cause the apparatus at least to:
   determine a plurality of devices of a second wireless network for null steering;
   transmit a trigger frame, the trigger frame indicating a transmission period for data frame transfer between the apparatus and another apparatus of the first wireless network, a spatial reuse opportunity for the second wireless network during the transmission period, and an additional period preceding the transmission period;
   receive, from at least one device of the second wireless network during the additional period, a channel state frame; and perform, based on the channel state frame, null steering towards the at least one device during the transmission period.

2. The apparatus of claim 1, wherein the additional period is dedicated to the acquisition of the channel state frame from at least one device of the second wireless network, and wherein the trigger frame indicates a duration of the additional period.

3. The apparatus of claim 1, wherein the plurality of devices of the second wireless network are determined based on inter-network measurements.

4. The apparatus of claim 1, wherein the trigger frame is a multi-user request-to-send frame, and wherein the channel state frame comprises a beamforming report comprising channel state information measured with the at least one device of the second wireless network.

5. The apparatus of claim 1, wherein the at least one non-transitory memory and the computer program code are configured to, with the at least one processor, cause the apparatus to:
transmit, during the additional period, an announcement frame indicating the at least one device of the second wireless network and a channel sounding signal for measurement of the channel state information.

6. The apparatus of claim 5, wherein the announcement frame is addressed to the at least one device of the second wireless network to prepare the at least one device of the second wireless network for measuring the channel sounding signal.

7. The apparatus of claim 1, wherein the trigger frame indicates uplink transmission for the transmission period, and wherein the channel state frame comprises an uplink pilot signal, and wherein the trigger frame is addressed to the at least one station of the second wireless network.

8. The apparatus of claim 1, wherein the at least one non-transitory memory and the computer program code are configured to, with the at least one processor, cause the apparatus to:
determine a first set of devices of the second wireless network as potential target devices for null steering;
transmit a null steering request to one or more devices of the first set;
receive at least one null steering response as a response to the null steering request, wherein the at least one null steering response indicates a subset of the first set of devices, the subset having a need for null steering and including the at least one device of the second wireless network; and
perform, during the transmission period, the null steering towards the subset of the first set of devices.

9. An apparatus for a first wireless network, comprising:
at least one processor; and
at least one non-transitory memory including computer program code; the at least one non-transitory memory and the computer program code configured to, with the at least one processor, cause the apparatus at least to:
detect a trigger frame transmitted by an access node of a second wireless network, the trigger frame indicating a transmission period for data frame transfer between the access node and a station of the second wireless network, a spatial reuse opportunity for the first wireless network during the transmission period, and an additional period preceding the transmission period;
transmit, during the additional period, a channel state frame to the access node; and
transfer a frame with another apparatus of the first wireless network during the transmission period.

10. The apparatus of claim 9, wherein the at least one non-transitory memory and the computer program code are configured to, with the at least one processor, cause the apparatus to:
enter a power-save mode when detecting a frame transmitted by the access node of the second wireless network, the frame indicating channel occupation by the second wireless network for a determined duration; and
in response to the detection of the trigger frame transmitted by the access node of the second wireless network, prevent the apparatus from entering the power-save mode and instead transmitting the channel state frame during the additional period.

11. The apparatus of claim 9, wherein the additional period is dedicated to the acquisition of the channel state information, and wherein the at least one non-transitory memory and the computer program code are configured to, with the at least one processor, cause the apparatus to:
delay a start of the transmission period for a duration of the additional period.

12. The apparatus of claim 9, wherein the trigger frame indicates uplink transmission for the transmission period, and wherein the channel state frame comprises an uplink pilot signal transmitted with the apparatus.

13. The apparatus of claim 9, wherein the trigger frame is a multi-user request-to-send frame addressed to the apparatus, wherein the channel state frame comprises a beamforming report comprising channel state information measured with the apparatus, and wherein the at least one non-transitory memory and the computer program code are configured to, with the at least one processor, cause the apparatus to:
upon detecting the multi-user request-to-send frame addressed to the apparatus, prevent entering a power-save mode during the additional period.

14. The apparatus of claim 9, wherein the at least one non-transitory memory and the computer program code are configured to, with the at least one processor, cause the apparatus to:
receive a null steering request from the access node of the second wireless network;
determine at least one device of the first wireless network that has a need for null steering with the access node of the second wireless network; and
transmit a null steering response as a response to the null steering request, wherein the null steering response indicates the at least one device of the first wireless network.

15. A method for an apparatus of a first wireless network, comprising:
determining, with the apparatus, a plurality of devices of a second wireless network for null steering;
transmitting a trigger frame with the apparatus, the trigger frame indicating a transmission period for data frame transfer between the apparatus and another apparatus of the first wireless network, a spatial reuse opportunity for the second wireless network during the transmission period, and an additional period preceding the transmission period;
receiving, with the apparatus from at least one device of the second wireless network during the additional period, a channel state frame; and performing, with the apparatus based on the channel state frame, null steering towards the at least one device during the transmission period.

16. The method of claim 15, wherein the additional period is dedicated to the acquisition of the channel state frame from at least one device of the second wireless network, and wherein the trigger frame indicates a duration of the additional period.

17. The method of claim 15, wherein the trigger frame is a multi-user request-to- send frame, and wherein the channel state frame comprises a beamforming report comprising channel state information measured with the at least one device of the second wireless network.

18. The method of claim 15, wherein the trigger frame indicates uplink transmission for the transmission period, and wherein the channel state frame comprises an uplink pilot signal, and wherein the trigger frame is addressed to the at least one station of the second wireless network.

19. The method of claim 15, comprising:
transmitting during the additional period, with the apparatus, an announcement frame indicating the at least one device of the second wireless network and a channel sounding signal for measurement of the channel state information.

20. The method of claim 15, comprising:
determining, with the apparatus, a first set of devices of the second wireless network as potential target devices for null steering;

transmitting, with the apparatus, a null steering request to one or more devices of the first set;

receiving, with the apparatus, at least one null steering response as a response to the null steering request, wherein the at least one null steering response indicates a subset of the first set of devices, the subset having a need for null steering and including the at least one device of the second wireless network; and performing, with the apparatus during the transmission period, the null steering towards the subset of the first set of devices.

* * * * *